(12) United States Patent
Mukai

(10) Patent No.: US 8,253,915 B2
(45) Date of Patent: Aug. 28, 2012

(54) METHOD FOR MANUFACTURING CELL AND CELL MANUFACTURED BY SUCH METHOD

(75) Inventor: Kenichi Mukai, Kobe (JP)

(73) Assignee: TPO Hong Kong Holding Limited, Shatin (HK)

( * ) Notice: Subject to any disclaimer, the term of this patent is extended or adjusted under 35 U.S.C. 154(b) by 1483 days.

(21) Appl. No.: 10/545,989

(22) PCT Filed: Feb. 17, 2004

(86) PCT No.: PCT/JP2004/001748
§ 371 (c)(1),
(2), (4) Date: May 18, 2007

(87) PCT Pub. No.: WO2004/074919
PCT Pub. Date: Sep. 2, 2004

(65) Prior Publication Data
US 2011/0096269 A1  Apr. 28, 2011

(30) Foreign Application Priority Data
Feb. 21, 2003 (JP) .................. 2003-045012

(51) Int. Cl.
*G02F 1/1339* (2006.01)
(52) U.S. Cl. .................. 349/153; 349/187; 349/154
(58) Field of Classification Search .................. 349/187
See application file for complete search history.

(56) References Cited

U.S. PATENT DOCUMENTS

| | | | | |
|---|---|---|---|---|
| 5,459,597 A * | 10/1995 | Yamamoto et al. | ........... | 349/189 |
| 5,725,032 A * | 3/1998 | Oshima et al. | ..................... | 141/7 |
| 5,815,231 A * | 9/1998 | Nishi et al. | ..................... | 349/151 |
| 6,326,225 B1* | 12/2001 | Yamazaki et al. | ............... | 438/30 |
| 2001/0015786 A1* | 8/2001 | Katsura | .......................... | 349/153 |
| 2001/0055827 A1* | 12/2001 | Asakura et al. | .................. | 438/30 |
| 2003/0025867 A1* | 2/2003 | Yoshizoe | ..................... | 349/153 |
| 2004/0070722 A1* | 4/2004 | Park | .............................. | 349/153 |
| 2005/0094084 A1* | 5/2005 | Hsu et al. | ..................... | 349/153 |

FOREIGN PATENT DOCUMENTS

| | | |
|---|---|---|
| CN | 1342913 | 4/2002 |
| EP | 1600809 A1 * | 11/2005 |
| JP | 62-164020 | 7/1987 |
| JP | 11231330 | 8/1999 |
| JP | 2001-183681 | 7/2001 |

\* cited by examiner

*Primary Examiner* — Edward Glick
*Assistant Examiner* — Sang Nguyen
(74) *Attorney, Agent, or Firm* — Liu & Liu

(57) ABSTRACT

A method for manufacturing a cell is disclosed wherein sealing bodies (500, 600) are formed on a color filter mother substrate (102), and the color filter mother substrate (102) and a TFT mother substrate (202) are so assembled that the sealing bodies (500, 600) are interposed between the color filter mother substrate (102) and the TFT mother substrate (202). Seal making portions (501, 511; 503, 509; 505, 507) are deformed so that gap portions (G) are closed.

19 Claims, 22 Drawing Sheets

METHOD FOR MANUFACTURING CELL AND CELL MANUFACTURED BY SUCH METHOD

"This application is a 371 of PCT Application No. PCT/JP2004/001748, filed Feb. 17, 2004, which claims the priority of JP 2003-045012, filed Feb. 21, 2003."

TECHNICAL FIELD

The present invention relates to a method for manufacturing a cell consisting of a first step of forming a first sealing body having first and second seal making portions with a first gap portion provided in between around a first area of a first supporting member and a second step of assembling the first supporting member and the second supporting member in such a way that the first sealing body is interposed between the first supporting member and the second supporting member.

The present invention also relates to a cell manufactured using such a method for manufacturing a cell.

BACKGROUND ART

As a method for assembling a liquid crystal cell which holds a liquid crystal layer between a TFT substrate and a color filter substrate, a method of applying a seal material to one substrate and dropping a liquid crystal on the substrate before pasting the substrates together is known (e.g., see "Press Journal Semiconductor FPD World, June"). This method eliminates the necessity to provide a pattern of a liquid crystal injection port for a seal pattern, and so it has an advantage of, for example, making omissible a sealing step for sealing the liquid crystal injection port.

The above described method requires the liquid crystal to be completely sealed when the substrates are pasted together, and therefore the seal material is applied in a partially overlapping manner. Therefore, when the substrates are pasted together, a cell gap in the area where the seal materials are pasted together may become wider than those in other areas, increasing a cell gap variation.

In order to prevent the cell gap from locally widening, the amount of overlapping of seal material may be reduced. But too small an amount of overlapping of seal material may cause the cell gap in the area where the seal material overlaps to become contrarily narrower than those in other areas, which will cause a problem of still increasing a cell gap variation.

DISCLOSURE OF INVENTION

In view of the above described circumstances, it is an object of the present invention to provide a method for manufacturing a cell and a cell manufactured using such a method, capable of reducing a cell gap variation.

The method for manufacturing a cell according to the present invention to attain the above described object consists of a first step of forming a first sealing body having first and second seal making portions with a first gap portion provided in between around a first area of a first supporting member and a second step of assembling the first supporting member and the second supporting member in such a way that the first sealing body is interposed between the first supporting member and the second supporting member, wherein in the second step, the first and second seal making portions are deformed so that at least part of the first gap portion is closed.

According to the method for manufacturing a cell of the present invention, the first gap portion is interposed between the first and second seal making portions. Providing such a first gap portion can prevent the cell gap produced when the first and second supporting members are assembled from locally becoming wider and consequently reduce a cell gap variation.

Furthermore, in the second step, the first and second seal making portions are deformed so that at least part of the first gap portion is closed, and as a result, the first and second seal making portions are closely connected. The width of this closely connected part is greater than the line width of the first (or second) seal making portion before the connection, and therefore it is possible to prevent, when the first and second supporting members are assembled, the cell gap from locally becoming narrower, and as a result still reduce a cell gap variation.

Here, according to the method for manufacturing a cell of the present invention, the first sealing body can include the first and second seal making portions and a seal main portion along the perimeter of the first area.

Furthermore, according to the method for manufacturing a cell of the present invention, in the first step, a second sealing body having third and fourth seal making portions with a second gap portion provided in between is also formed around a second area of the first supporting member and the first and second seal making portions are preferably continuously connected to the second and fourth seal making portions.

When the first and second seal making portions are continuously connected to the third and fourth seal making portions, it is possible to form the second sealing body while remaining connected to the first sealing body and complete drawing in a shorter time.

Here, the method for manufacturing a cell of the present invention includes a third step of cutting the first supporting member of the first and second supporting members assembled as shown above along a cutting line between the first area and the second area and in the first step, it is possible to form the continuously connected first and third seal making portions and the continuously connected third and fourth seal making portions so as to cross the cutting line. In this case, the first supporting body preferably includes a first supporting portion including the first area and a second supporting portion including the second area, which contacts the first supporting portion across a boundary and the boundary is positioned on the cutting line.

The boundary being positioned on the cutting line simplifies the cutting step.

Furthermore, according to the method for manufacturing a cell of the present invention, the first sealing body can include a plurality of pairs of the first and second seal making portions and in this case, the first sealing body includes the plurality of pairs and a plurality of seal sub portions along the perimeter of the first area.

Furthermore, the cell of the present invention is a cell including a first supporting plate, a second supporting plate and sealing means interposed between the first supporting plate and the second supporting plate, wherein the sealing means includes a surface substantially flush with a side end face of the first or second supporting plate.

Such a cell can be manufactured using the method for manufacturing a cell of the present invention.

BEST MODE FOR CARRYING OUT THE INVENTION

Figure 1:
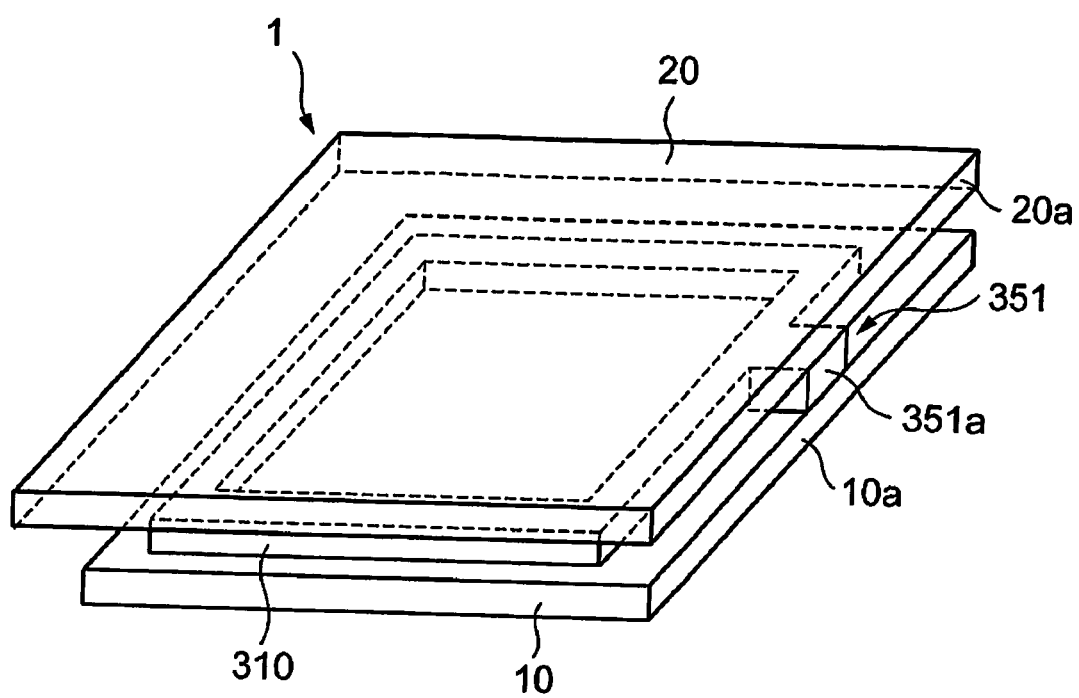
FIG. 1 is a perspective view of a liquid crystal cell 1 according to a first embodiment of the present invention.
Figure 2:
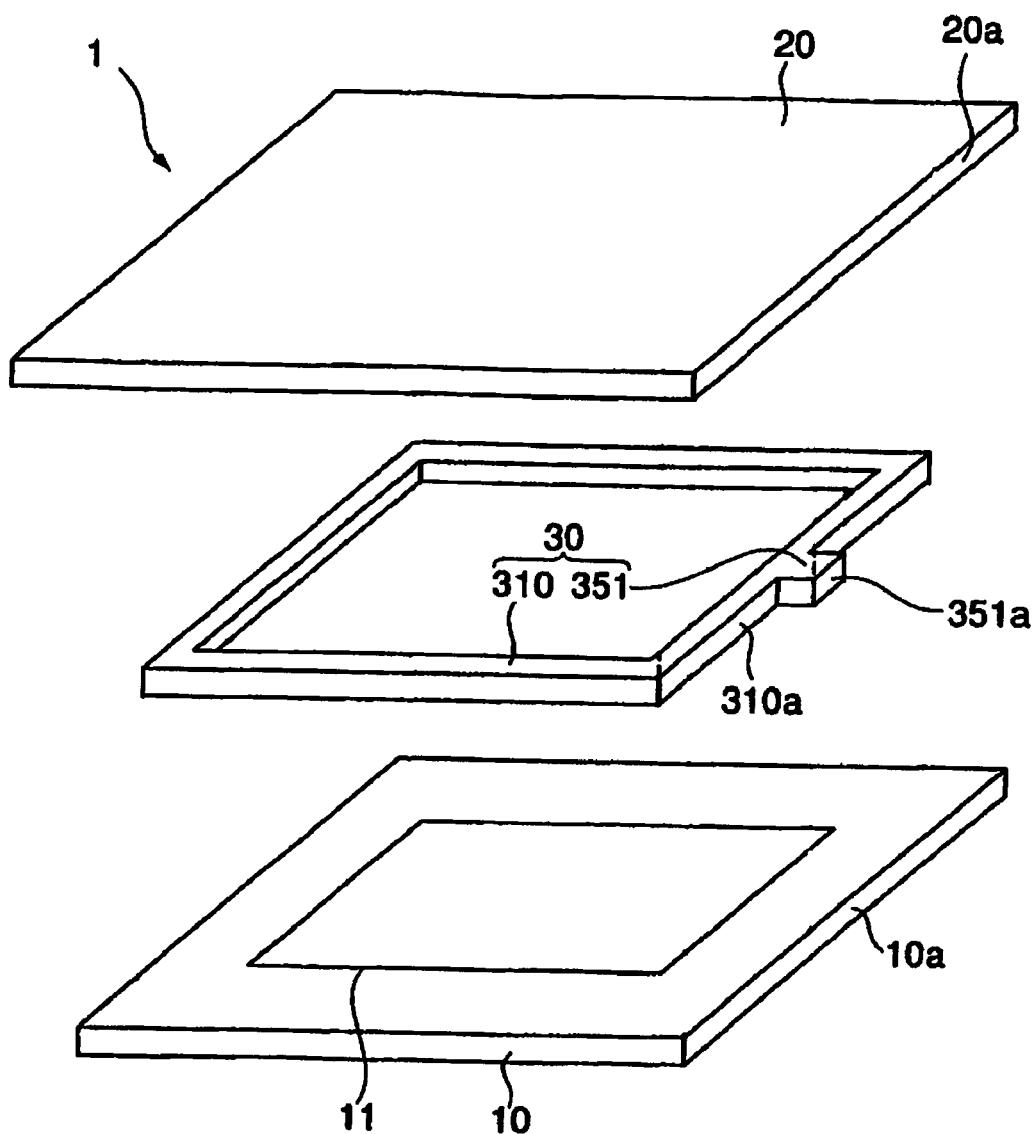
FIG. 2 is an exploded view of the liquid crystal cell 1 shown in FIG. 1.

FIG. 1 is a perspective view of a liquid crystal cell 1 according to a first embodiment of the present invention and FIG. 2 is an exploded view of the liquid crystal cell 1 shown in FIG. 1.

The liquid crystal cell 1 is provided with a color filter substrate 10 and a TFT substrate 20. These substrates 10 and 20 are pasted together using sealing means 30. The space enclosed by the substrates 10 and 20 and sealing means 30 is filled with a liquid crystal material (not shown).

A color filter (not shown) is formed in a display area 11 of the color filter substrate 10 and a TFT (not shown) provided for each sub pixel is formed in a display area (not shown) of the TFT substrate 20. The sealing means 30 is interposed between the color filter substrate 10 and TFT substrate 20 in such a way as to encompass the respective display areas of the color filter substrate 10 and TFT substrate 20. This sealing means 30 includes a loop-shaped sealing means main portion 310 and a sealing means making portion 351. This sealing means making portion 351 sticks out of a side end face 310a of the sealing means main portion 310 and a side end face 351a of this sealing means making portion 351 is substantially flush with a side end face 10a of the color filter substrate 10 and a side end face 20a of the TFT substrate 20. A method for manufacturing the liquid crystal cell 1 will be explained below with reference to FIG. 3 to FIG. 7 and FIG. 1 and FIG. 2 as required.

Figure 3:
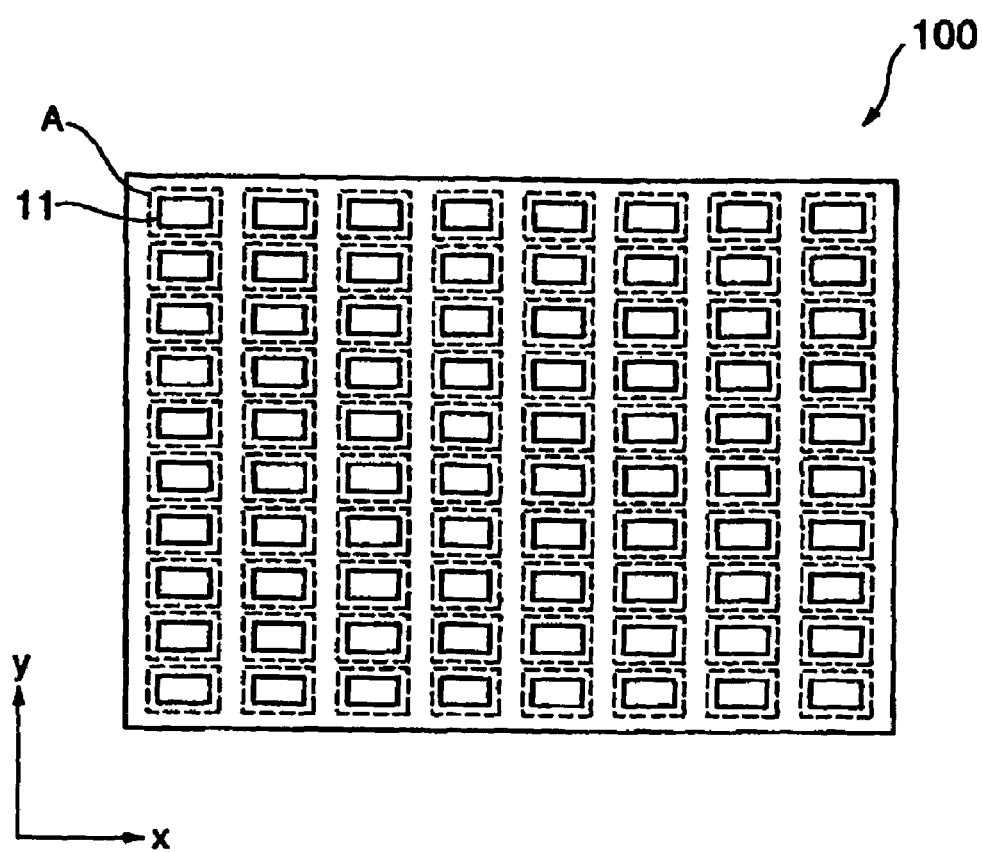
FIG. 3 is a plan view of a color filter mother substrate 100.

FIG. 3 is a plan view of a color filter mother substrate 100.

This color filter mother substrate 100 includes many display areas 11, in each of which a color filter is formed. A portion (hereinafter referred to as "color filter substrate portion") A including the display area 11 is the part used as the color filter substrate 10 shown in FIG. 1. FIG. 3 shows 80 color filter substrate portions A (8 portions in the x direction and 10 portions in the y direction) arranged in a matrix form, but the number of color filter substrate portions A is changeable as appropriate. A seal material is applied to the color filter mother substrate 100 having such a structure.

Figure 4:
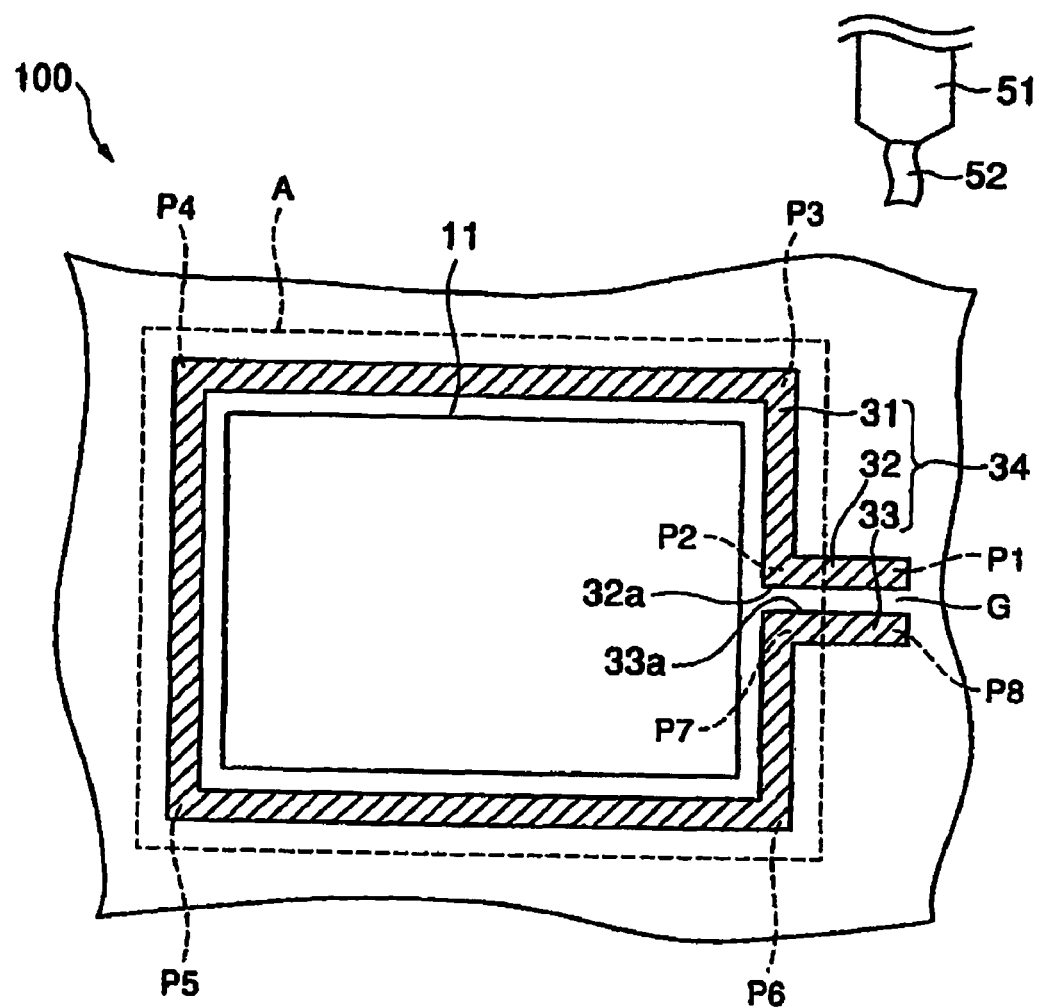
FIG. 4 is a plan view showing one color filter substrate portion A of the color filter mother substrate 100 with a seal material applied thereto.

FIG. 4 is a plan view showing one color filter substrate portion A of the color filter mother substrate 100 with the seal material applied thereto.

A sealing body 34 (shown with hatching) is formed in each color filter substrate portion A of the color filter mother substrate 100. This sealing body 34 is formed by applying the seal material along the perimeter of the display area 11. As the seal material, an ultraviolet curing material or thermosetting material can be used. This sealing body 34 is made up of a seal main portion 31 and first and second seal making portions 32 and 33. In FIG. 4, the seal main portion 31 is formed so as to extend from position P2 through positions P3, P4, P5 and P6 to position P7. The first seal making portion 32 is formed so as to extend between positions P1 and P2 and this first seal making portion 32 is connected to the seal main portion 31 at position P2. The second seal making portion 33 is formed so as to extend between positions P7 and P8 and this second seal making portion 33 is connected to the seal main portion 31 at position P7. The method of forming the sealing body 34 will be explained more specifically below.

First, a dispenser for discharging a seal material will be prepared. The seal material 52 is discharged from a nozzle 51 of this dispenser and the seal material 52 is applied from position P1 outside the color filter substrate portion A to position P2 close to the display area 11 inside the color filter substrate portion A. In this way, the first seal making portion 32 of the sealing body 34 is formed. The seal material 52 continues to be discharged from the nozzle 51 so that the seal material 52 connected to the seal making portion 32 is applied along the perimeter of the display area 11 from position P2 through positions P3, P4, P5 and P6 to position P7. In this way, the seal main portion 31 which is connected to the first seal making portion 32 is formed. The seal material 52 further continues to be discharged from the nozzle 51 and the seal material 52 which is connected to the seal main portion 31 is applied from position P7 to position P8 close to position P1. In this way, the second seal making portion 33 which is connected to the seal main portion 31 is formed. Here, note that a gap portion G is provided between an inner wall surface 32a of the first seal making portion 32 and an inner wall surface 33a of the second seal making portion 33.

In this way, the seal material is applied to the color filter substrate portion A. FIG. 4 shows a state in which the sealing body is formed in one color filter substrate portion A of the color filter mother substrate 100, but sealing bodies are also formed in other color filter substrate portions A using the same procedure described above. After the sealing bodies are formed on the color filter mother substrate 100, a liquid crystal is dropped on the area of each color filter substrate portion A surrounded by the sealing body and a TFT mother substrate is pasted to the color filter mother substrate 100 on which the liquid crystal has been dropped.

Figure 5:
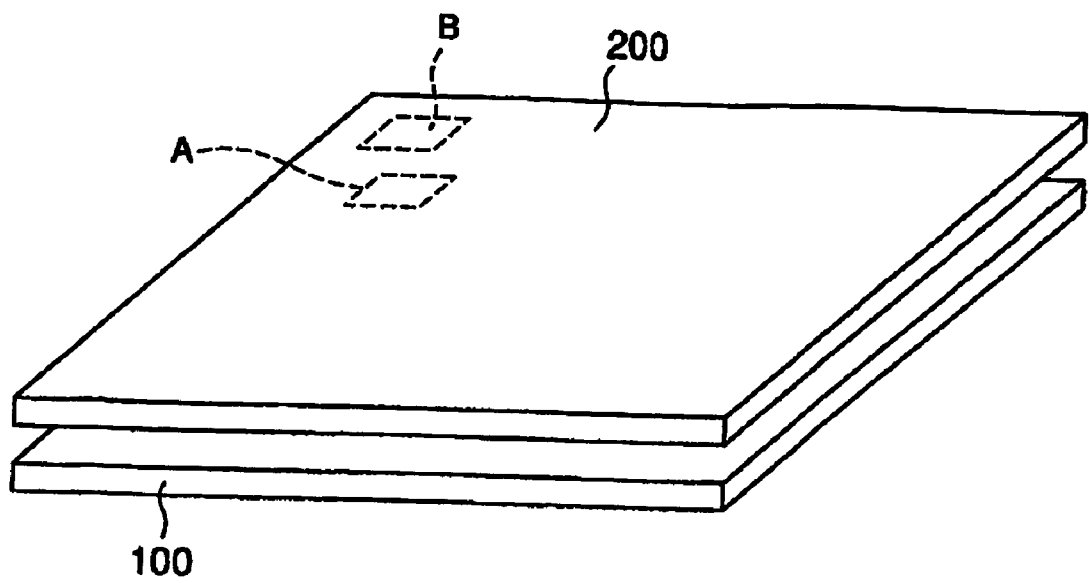
FIG. 5 is a perspective view showing the color filter mother substrate 100 and a TFT mother substrate 200 pasted together.

FIG. 5 is a perspective view showing the color filter mother substrate 100 and TFT mother substrate 200 pasted together.

The TFT mother substrate 200 includes 80 TFT substrate portions B corresponding to 80 color filter substrate portions A of the color filter mother substrate 100. This TFT substrate portion B is used as the TFT substrate 20 shown in FIG. 1. FIG. 5 shows one TFT substrate portion B on the TFT mother substrate 200 as a representative. The TFT mother substrate 200 having such a structure is pasted to the color filter mother substrate 100 on which the liquid crystal has been dropped. The color filter mother substrate 100 includes 80 color filter substrate portions A, while the TFT mother substrate 200 includes 80 TFT substrate portions B, and therefore 80 combinations of the color filter substrate portions A and TFT substrate portions B are formed by pasting the color filter mother substrate 100 to the TFT mother substrate 200.

Figure 6:
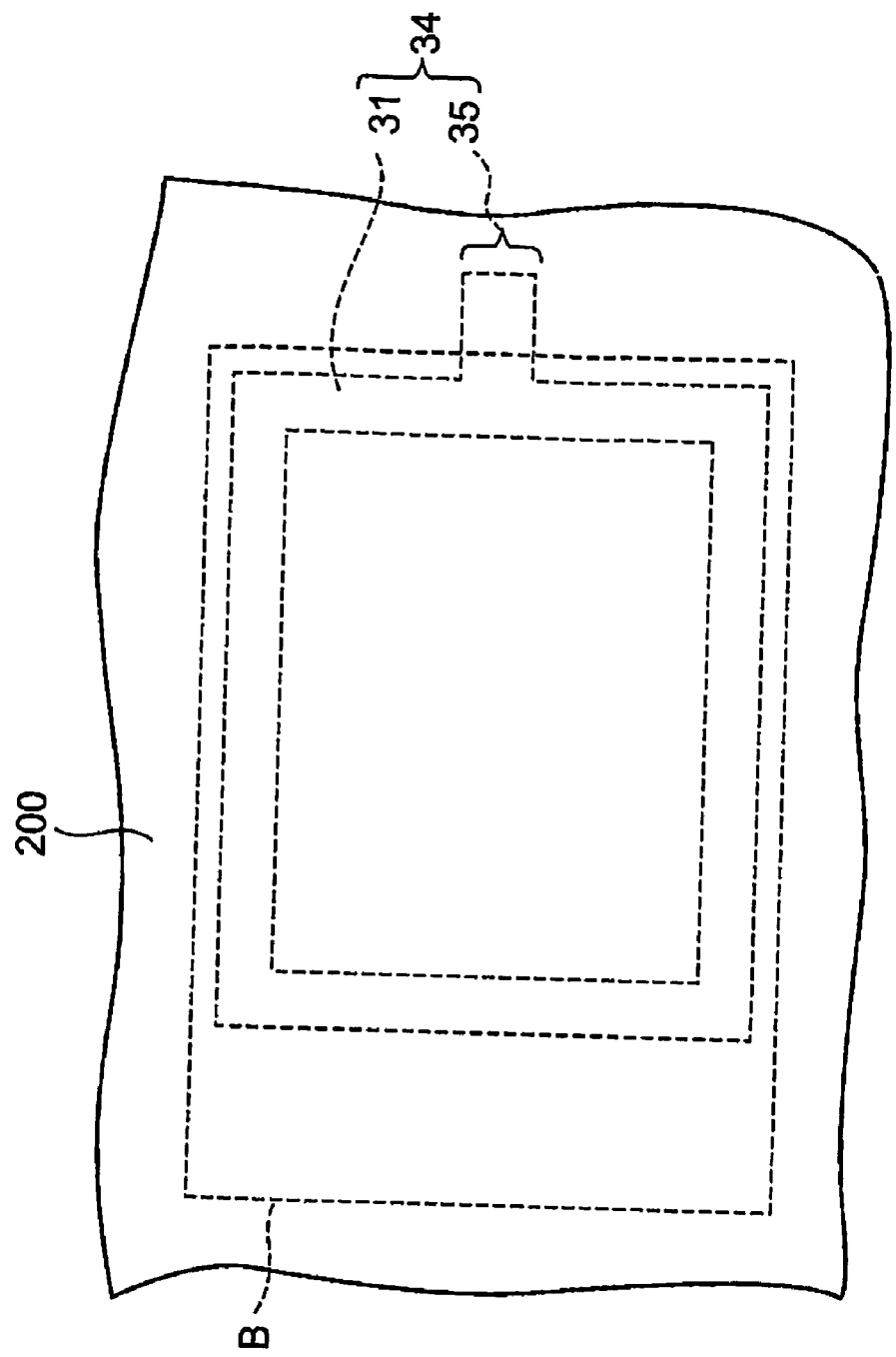
FIG. 6 is a plan view of a pair of color filter substrate portion A and TFT substrate B shown in FIG. 5 viewed from the side of the TFT mother substrate 200.
Figure 7:
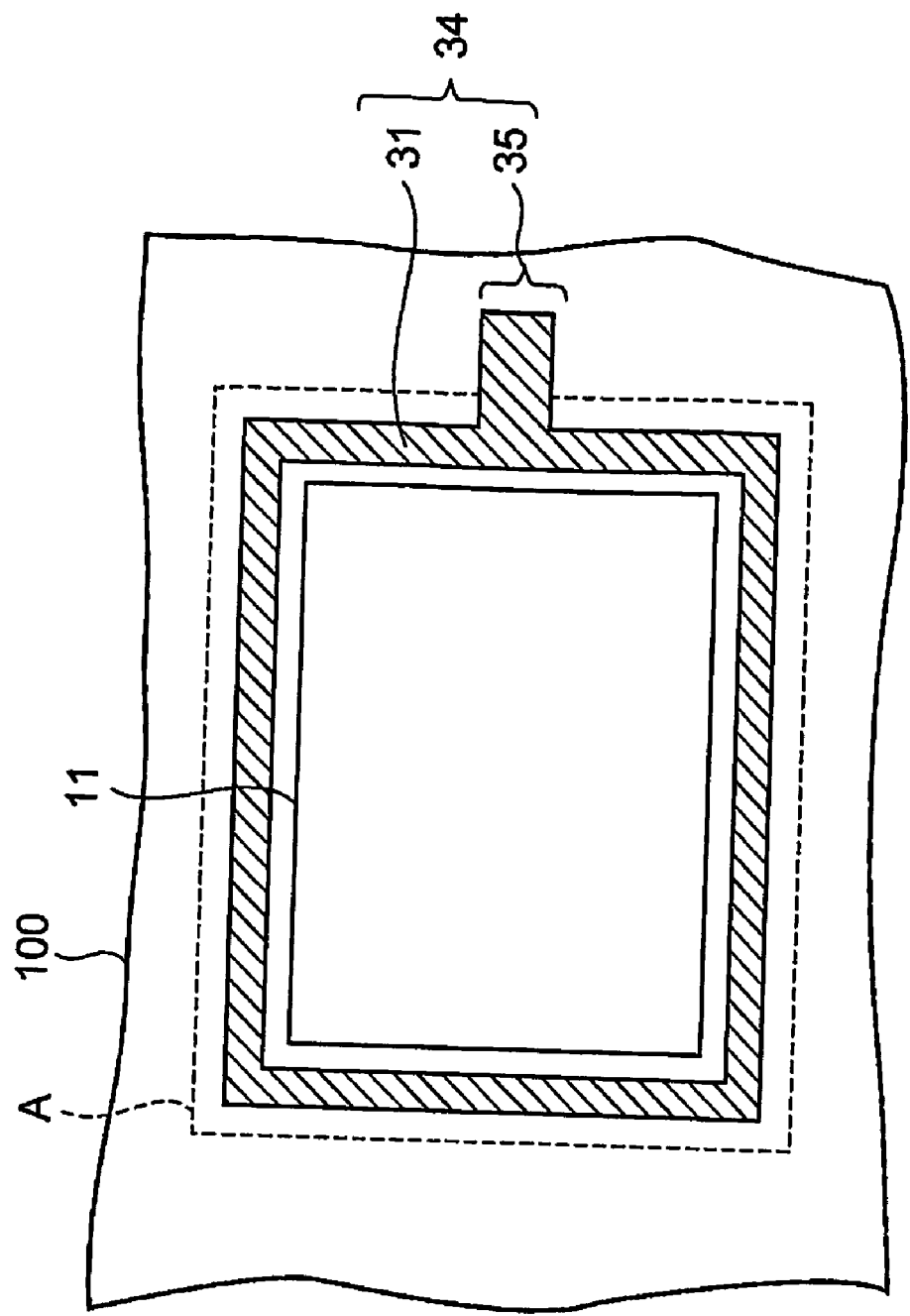
FIG. 7 illustrates a state of FIG. 6 with the TFT mother substrate 200 removed.

FIG. 6 is a plan view of one set of the color filter substrate portion A and TFT substrate B shown in FIG. 5 viewed from the side of the TFT mother substrate 200 and FIG. 7 illustrates a state of FIG. 6 with the TFT mother substrate 200 removed.

When the TFT mother substrate 200 is pasted to the color filter mother substrate 100, a predetermined pressure is applied to the sealing body 34, and therefore the sealing body 34 (see FIG. 4) is pressed, and as a result, the line width of the sealing body 34 increases. At this time, the line widths of the first and second seal making portions 32 and 33 also increase, and so the inner wall surface 32a (see FIG. 4) of the first seal making portion 32 sticks fast to the inner wall surface 33a (see FIG. 4) of the second seal making portion 33, and as a result, a seal bonded portion 35 made up of the first and second seal making portions 32 and 33 stuck fast to each other. When this seal bonded portion 35 is formed, the liquid crystal is sealed in a space enclosed by the sealing body 34 including the color filter substrate portion A, TFT substrate portion B and seal bonded portion 35. Thus, the liquid crystal is hermetically sealed by sticking fast the inner wall surface 32a of the first seal making portion 32 to the inner wall surface 33a of the second seal making portion 33, and therefore if the width of the gap portion G is too wide, it is difficult to seal the liquid crystal. Therefore, the width of the gap portion G is required not be too wide. For example, when the line width of the sealing body 34 before the color filter mother substrate 100 is pasted to the TFT mother substrate 200 is 0.3 mm to 0.4 mm, the width of the gap portion G can be, for example, 0.1 mm to 0.2 mm.

As described above, after the color filter mother substrate 100 is pasted to the TFT mother substrate 200, the sealing body 34 including the seal bonded portion 35 is cured. Through the curing of the sealing body 34, the TFT mother substrate 200 is strongly bonded to the color filter mother substrate 100 and the substrate 100 and 200 are assembled. After the bonding of the substrates, the color filter mother substrate 100 is cut into color filter substrate portions A along cutting lines for the color filter mother substrate 100 and the TFT mother substrate 200 is cut into TFT substrate portions B along cutting lines for the TFT mother substrate 200. Through such cutting, 80 liquid crystal cells 1 shown in FIG. 1 are manufactured from the assembled color filter mother substrate 100 and TFT mother substrate 200. In this cutting step, the seal bonded portion 35 of the cured sealing body 34 is also cut, and as a result, each liquid crystal cell 1 is provided with the sealing means 30 made up of the sealing means main portion 310 and sealing means connection portion 351 as shown in FIG. 2. The side end face 351a of this sealing means connection portion 351 is substantially flush with the side end face 10a of the color filter substrate 10 and the side end face 20a of the TFT substrate 20.

In the first embodiment, as shown in FIG. 4, the gap portion G is provided between the first and second seal making portions 32 and 33, and the seal material is applied in such a way that the seal making portions 32 and 33 do not overlap with each other. In contrast, a method of applying a seal material in such a way that part of the sealing body overlaps is conventionally known, but such a method has a problem as shown below.

Figure 8:
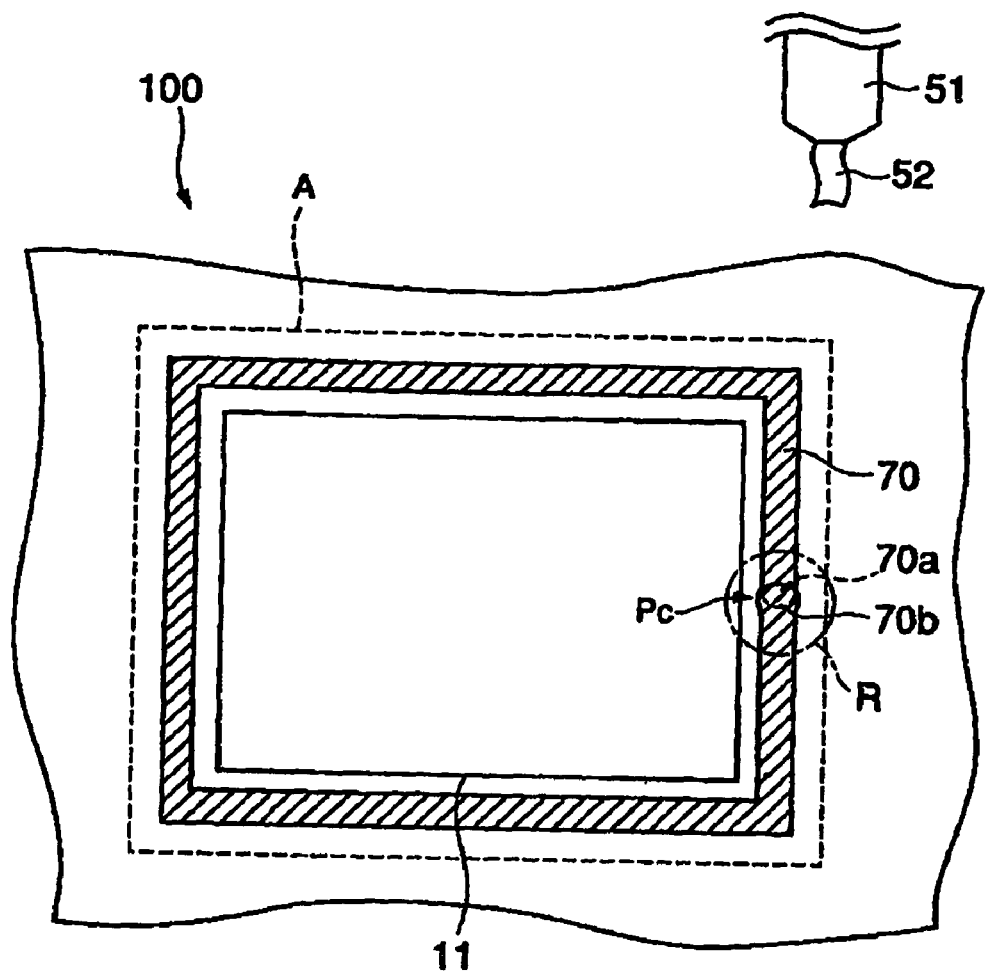
FIG. 8 is a plan view of the color filter mother substrate 100 on which a sealing body 70 is formed using a conventional method.
Figure 9:
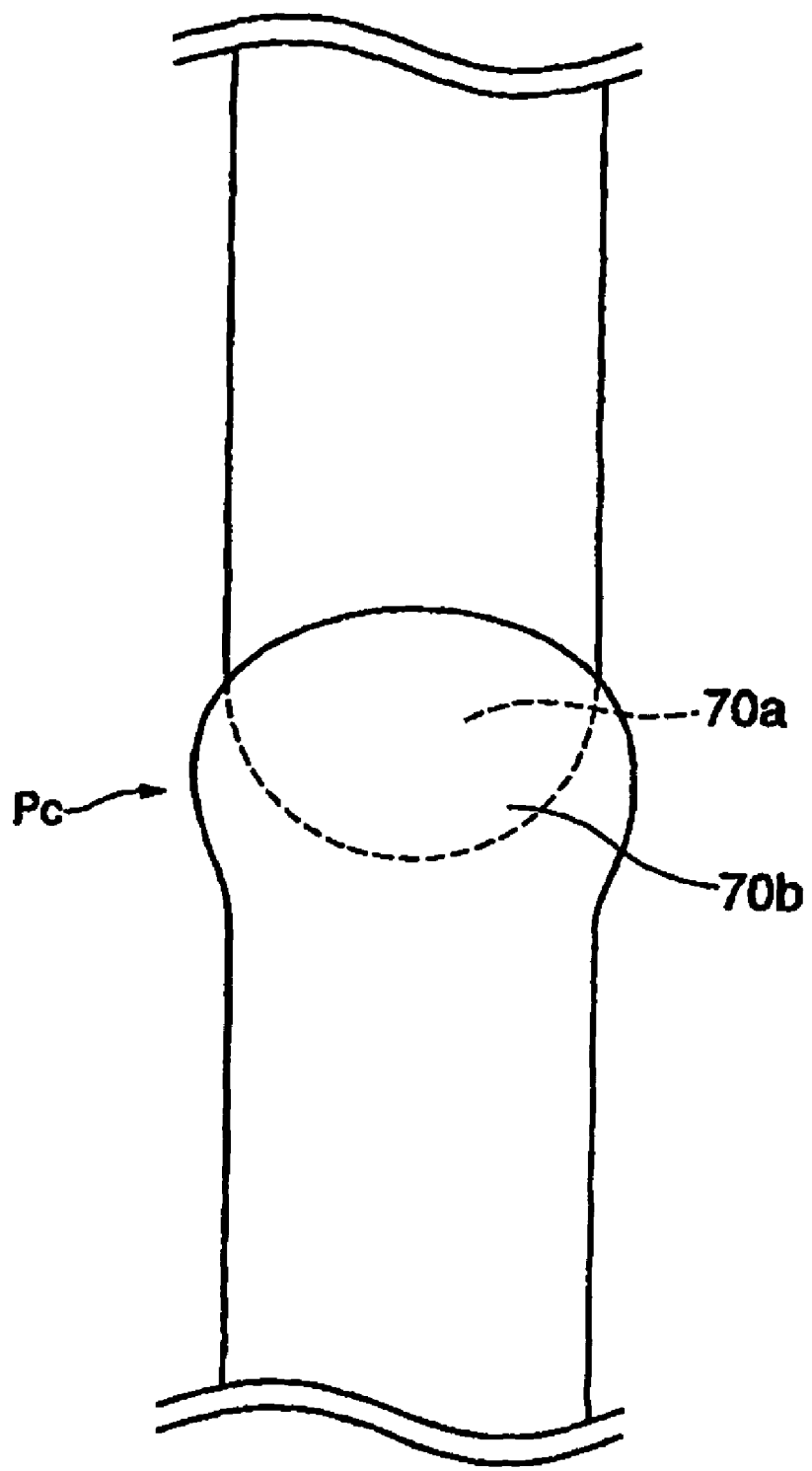
FIG. 9 is an enlarged view of the region R shown in FIG. 8.

FIG. 8 is a plan view of a color filter mother substrate 100 on which a sealing body 70 is formed using a conventional method and FIG. 9 is an enlarged view of the region R shown in FIG. 8.

The sealing body 70 is formed by starting to discharge a seal material 52 from a nozzle 51 at position Pc on the color filter mother substrate 100, supplying the seal material 52 at position Pc, applying the seal material supplied at position Pc along the perimeter of a display area 11 and stopping the supply of the seal material 52 from the nozzle 51 at position Pc. One end 70b of the sealing body 70 overlaps with the other end 70a at position Pc. Therefore, an amount of the seal material applied at position Pc is greater than the amounts of the seal material applied at other positions. In this case, when the color filter mother substrate 100 is pasted to the TFT mother substrate 200, the cell gap at position Pc tends to become wider than cell gaps at other positions, resulting in a problem that a cell gap variation in the display area 11 increases. To solve this problem, the amount of seal material 52 overlapped at position Pc may be reduced, but too small an amount of the seal material overlapped results in a small line width of the sealing body 70 at position Pc. In this case, the cell gap at position Pc becomes narrower conversely, there still is a problem that the cell gap variation increases.

In contrast, according to the first embodiment, as shown in FIG. 4, the gap portion G is provided between the seal making portions 32 and 33 so as to prevent the seal material 52 from overlapping in the vicinity of the display area 11. Therefore, it is possible to prevent the cell gap from becoming locally wider. Furthermore, when the color filter mother substrate 100 and TFT mother substrate 200 are pasted together, the seal making portions 32 and 33 are stuck fast to each other so as to close the gap portion G, and as a result, the seal bonded portion 35 is formed. The width of this seal bonded portion 35 becomes greater than the respective line widths of the seal making portions 32 and 33 before the bonding. Therefore, it is possible to prevent parts having small widths from being formed in the sealing body 34, and as a result, it is also possible to prevent the cell gap from becoming locally narrower. Thus, it is possible to prevent the cell gap from becoming locally wider or narrower and thereby reduce the cell gap variation in the display area 11.

The seal making portions 32 and 33 are formed in such a way as not to overlap throughout the gap portion G. However, if the cell gap variation in the display area 11 can be reduced sufficiently, the seal making portions 32 and 33 can overlap with each other at a position sufficiently distant from the display area 11. Even when parts of the seal making portions 32 and 33 overlap, if the overlapping parts are sufficiently distant from the display area 11, it is possible to reduce the cell gap variation in the display area 11.

Furthermore, the sealing body 34 is applied in the pattern shown in FIG. 4, but this application pattern may be different from the pattern shown in FIG. 4. An example of the sealing body applied in a pattern different from the pattern shown in FIG. 4 will be explained below.

Figure 10:
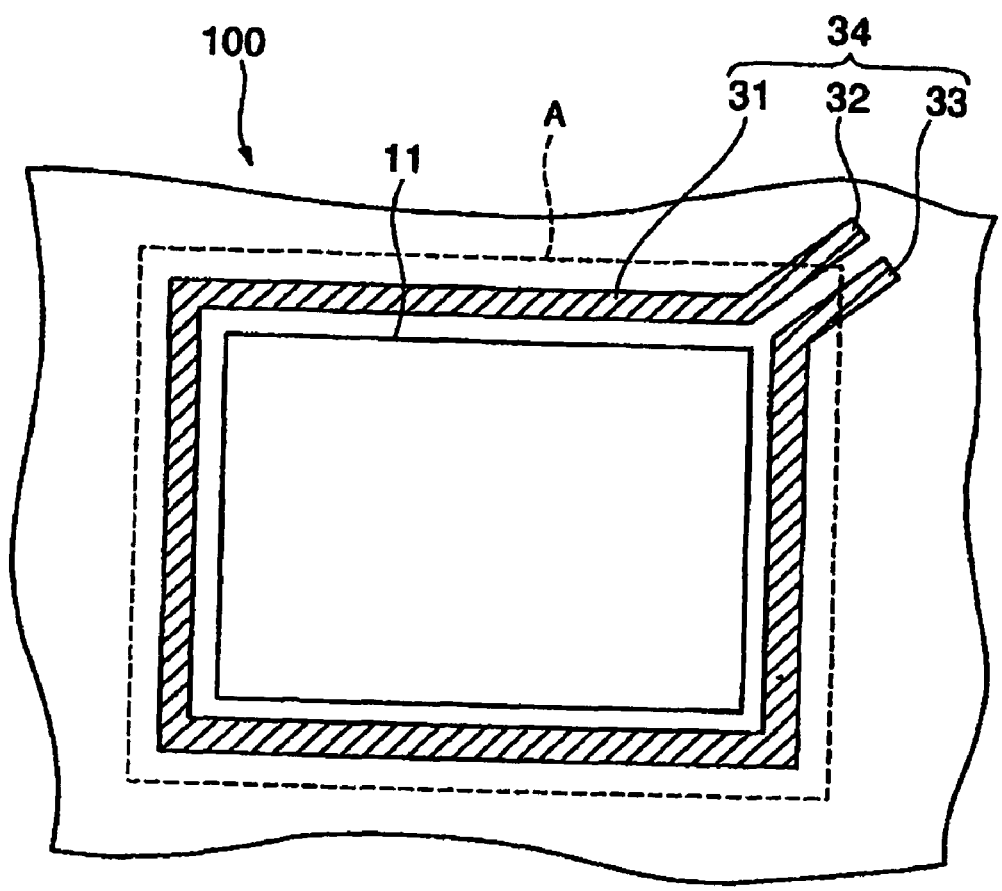
FIG. 10 illustrates an example of a sealing body having a seal pattern different from the seal pattern shown in FIG. 4.

FIG. 10 illustrates the example.

In FIG. 10, the seal making portion 32 and 33 of the sealing body 34 are provided in a corner of the display area 11. The sealing body 34 has no overlapping part in the mode shown in FIG. 10, either, and it is thereby possible to reduce a cell gap variation.

Figure 11:
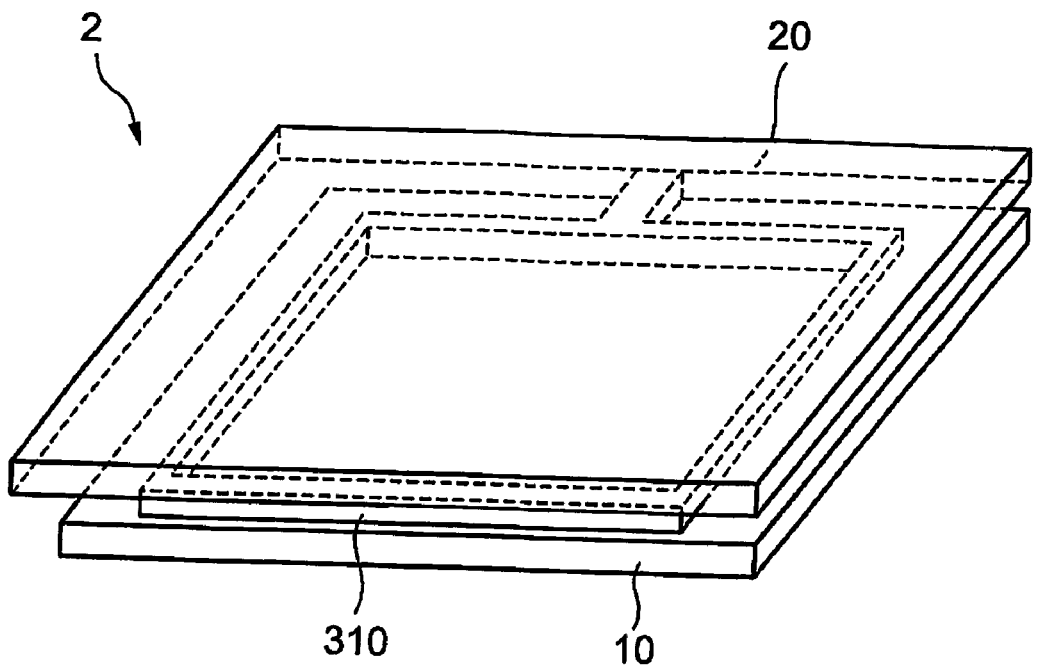
FIG. 11 is a perspective view of a liquid crystal cell 2 according to a second embodiment of the present invention.
Figure 12:
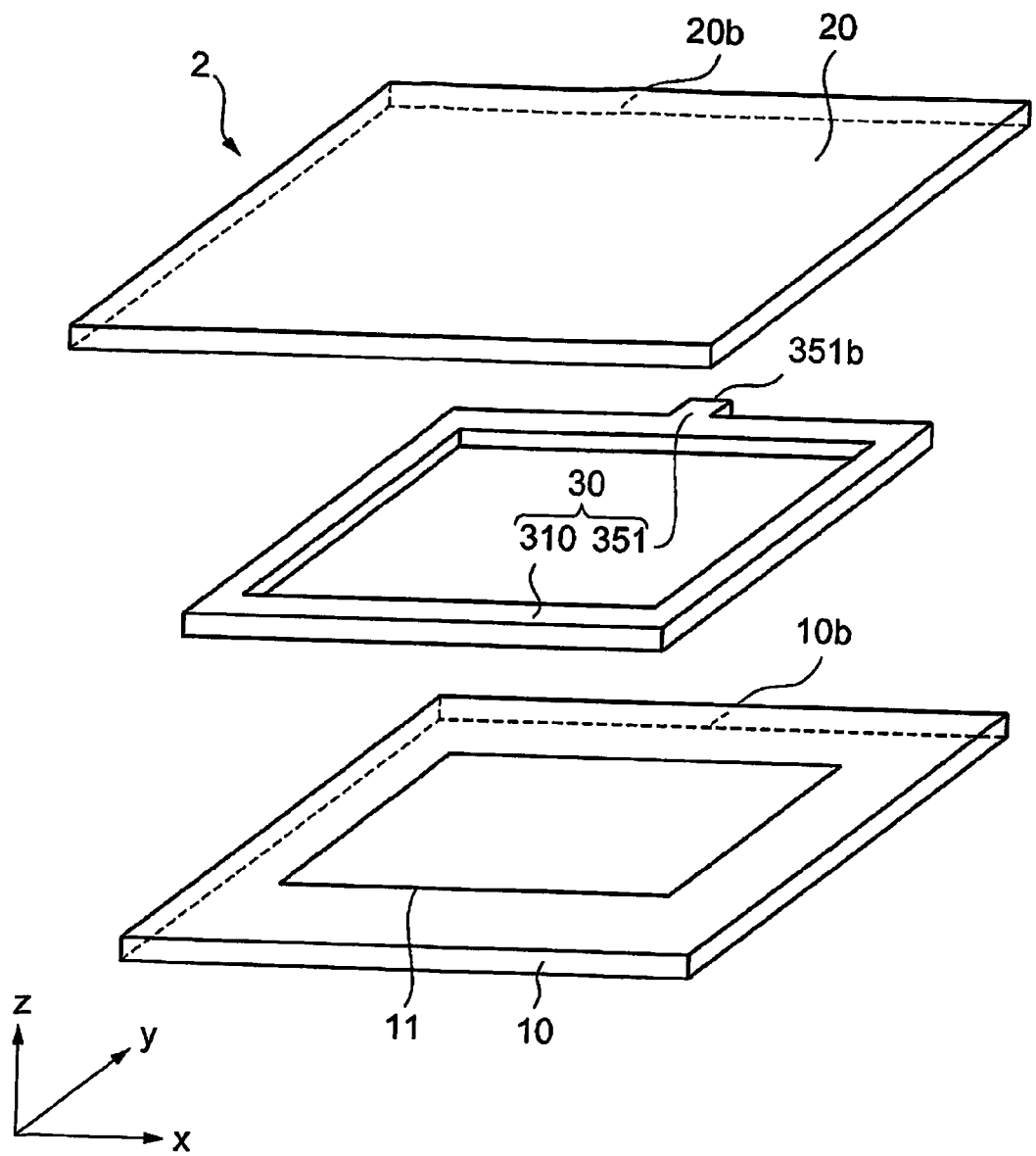
FIG. 12 is an exploded view of the liquid crystal cell 2 shown in FIG. 11.

FIG. 11 is a perspective view of a liquid crystal cell 2 according to a second embodiment of the present invention and FIG. 12 is an exploded view of the liquid crystal cell 2 shown in FIG. 11.

The liquid crystal cell 2 shown in FIG. 11 is the same as the liquid crystal cell 2 shown in FIG. 1 except in that the position of the sealing means making portion 351 is different.

The method for manufacturing the liquid crystal cell 2 will be explained with reference to FIG. 13 to FIG. 16 as well as FIG. 11 and FIG. 12 as required.

Figure 13:
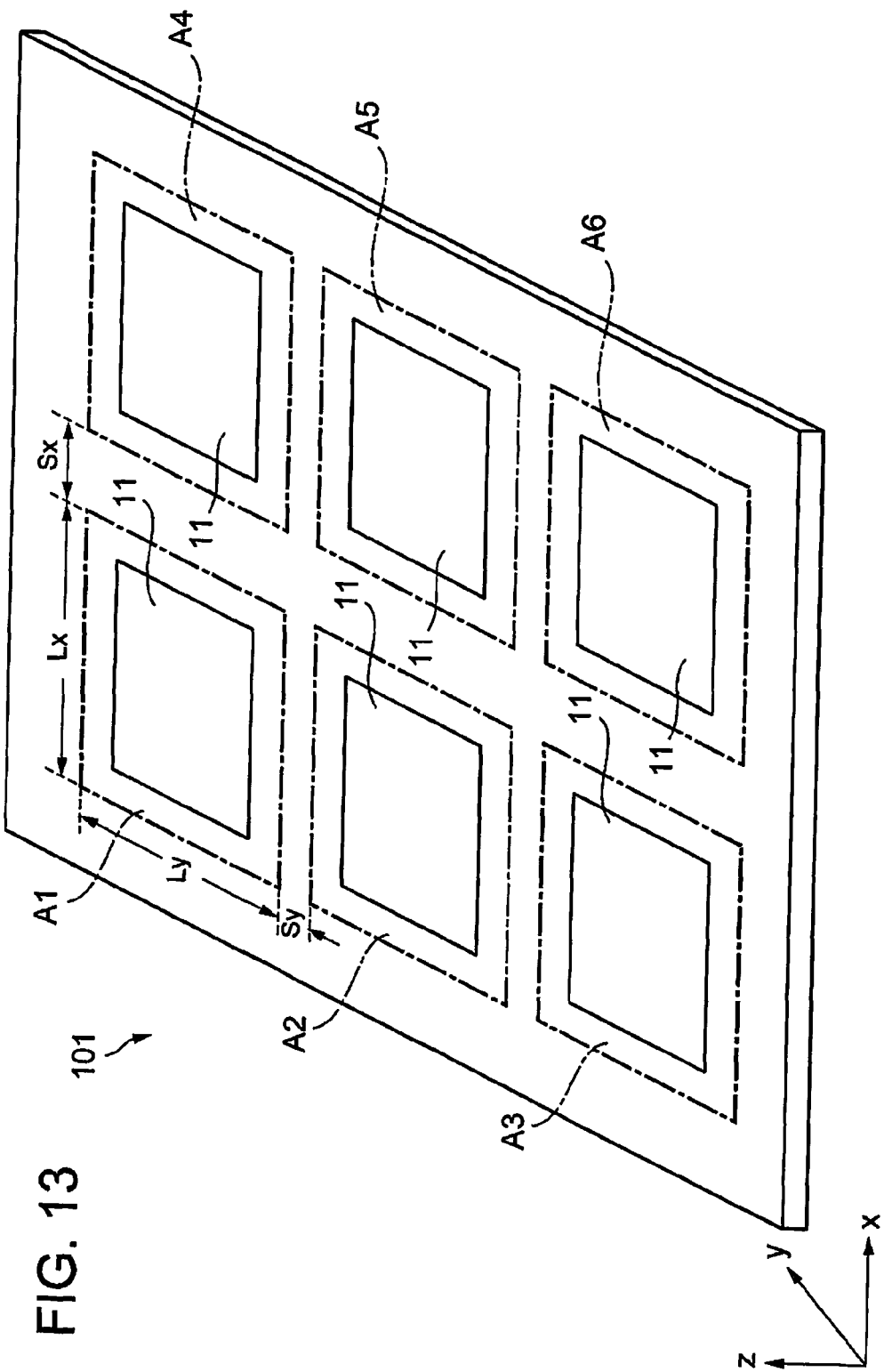
FIG. 13 is a perspective view of a color filter mother substrate 101.

FIG. 13 is a perspective view of a color filter mother substrate 101.

This color filter mother substrate 101 includes a plurality of display areas 11, in each of which a color filter is formed. The respective display areas 11 are included in the corresponding color filter substrate portions A1 to A6. FIG. 13 shows an example where the color filter mother substrate 101 includes six color filter substrate portions A1 to A6, but the number of color filter substrate portions can be changed as appropriate. Each of the color filter substrate portions A1 to A6 has a length of Lx in the x direction and a length of Ly in the y direction. The two color filter substrate portions placed side by side in the x direction are spaced by a distance Sx, while the two color filter substrate portions placed side by side in the y direction are spaced by a distance Sy. A seal material is applied to the color filter mother substrate 101 having such a structure.

Figure 14:
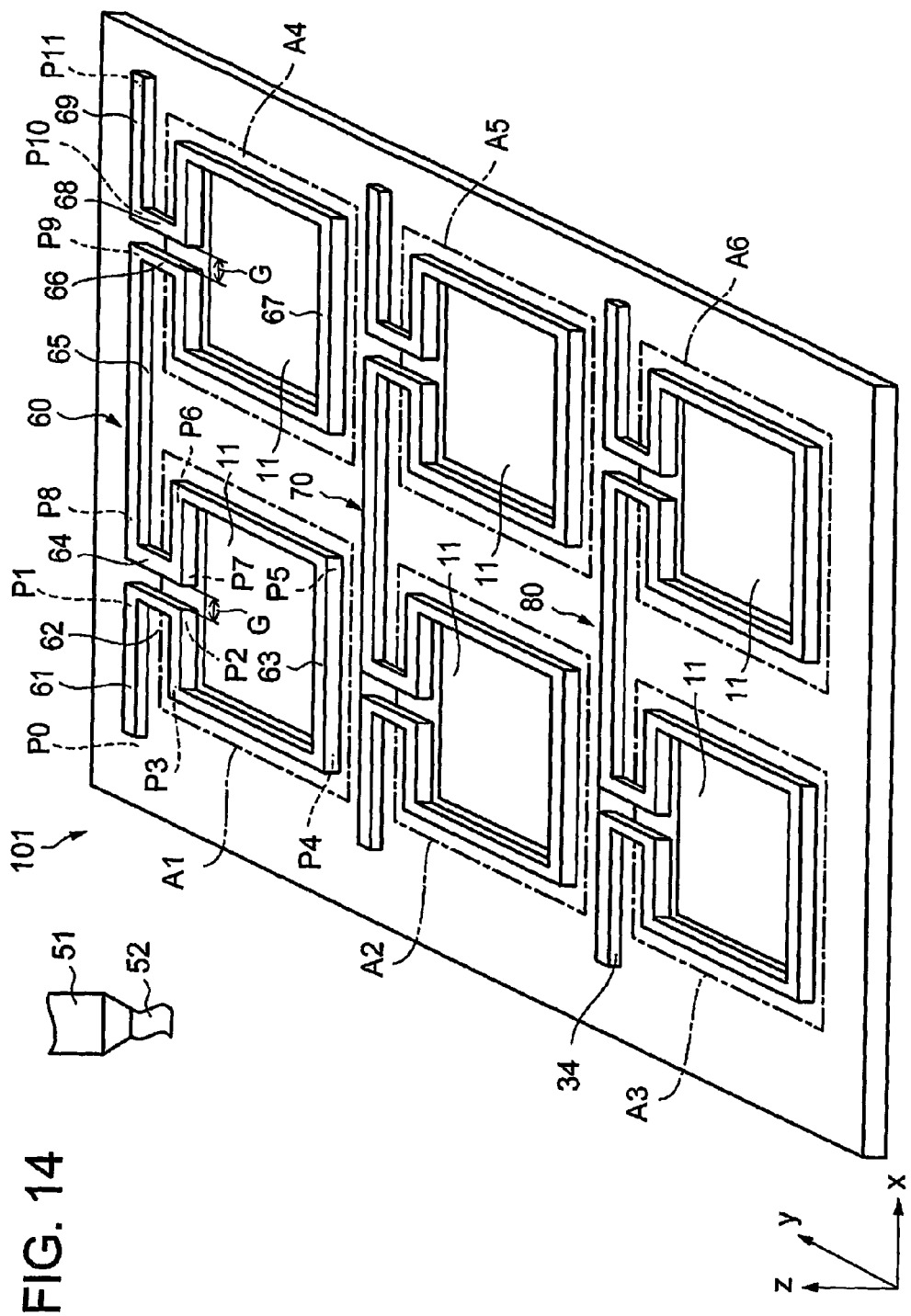
FIG. 14 is a plan view of the color filter mother substrate 101 with a seal material applied thereto.

FIG. 14 is a plan view of the color filter mother substrate 101 with a seal material applied thereto.

As shown in FIG. 11, the seal material is applied to the color filter substrate portions A1 and A4, A2 and A5, A3 and A6 arranged side by side in the x direction, and as a result, three sealing bodies 60, 70 and 80 are formed. These three sealing bodies 60, 70 and 80 are formed by discharging a seal material 52 from a nozzle 51 and applying the discharged seal material 52 to the color filter mother substrate 101. Each of the sealing bodies 60, 70 and 80 is formed using the same procedure, and therefore the procedure for forming the sealing body 60 will be explained as a representative.

A seal starting portion 61 is formed by discharging the seal material 52 from the nozzle 52 of the dispenser and applying the seal material from position P0 outside the color filter substrate portion A1 to position P1 along one side of the color filter substrate portion A1. Next, a seal making portion 62 is formed by applying the seal material 52 which is connected to the seal starting portion 61 from position P1 outside the color filter substrate portion A1 to position P2 inside the color filter substrate portion A1. Furthermore, a seal main portion 63 which is connected to the seal making portion 62 is formed by applying the seal material 52 which is connected to the seal making portion 62 from position P2 through positions P3, P4, P5 and P6 to position P7 close to position P2. Furthermore, a seal making portion 64 which is connected to the seal main portion 63 is formed by applying the seal material 52 which is connected to the seal main portion 63 from position P7 to position P8 outside the color filter substrate portion A. A gap portion G is provided between the seal making portions 62 and 64.

Even after the second seal making portion 64 is formed, the seal material 52 continues to be discharged from the nozzle 51 and the seal material 52 which is connected to this second seal making portion 64 is applied from position P8 to position P9 outside the color filter substrate portion A4. In this way, a seal intermediate portion 65 is formed. After the formation of the seal intermediate portion 65, a seal making portion 66, a seal main portion 67 and a seal making portion 68 are formed using the same procedure as that described above. Next, a seal end portion 69 is formed by applying the seal material 52 which is connected to this seal making portion 68 from position P10 to position P11. By so doing, the sealing body 60 extending over the two color filter substrate portions A1 and A4 is formed.

The other sealing bodies 70 and 80 are formed using the same procedure as that for the sealing body 60.

After the three sealing bodies 60 to 80 are formed on the color filter mother substrate 101, a liquid crystal is dropped into the respective color filter substrate portions A1 to A6 and the color filter mother substrate 101 is pasted to a TFT mother substrate.

Figure 15:
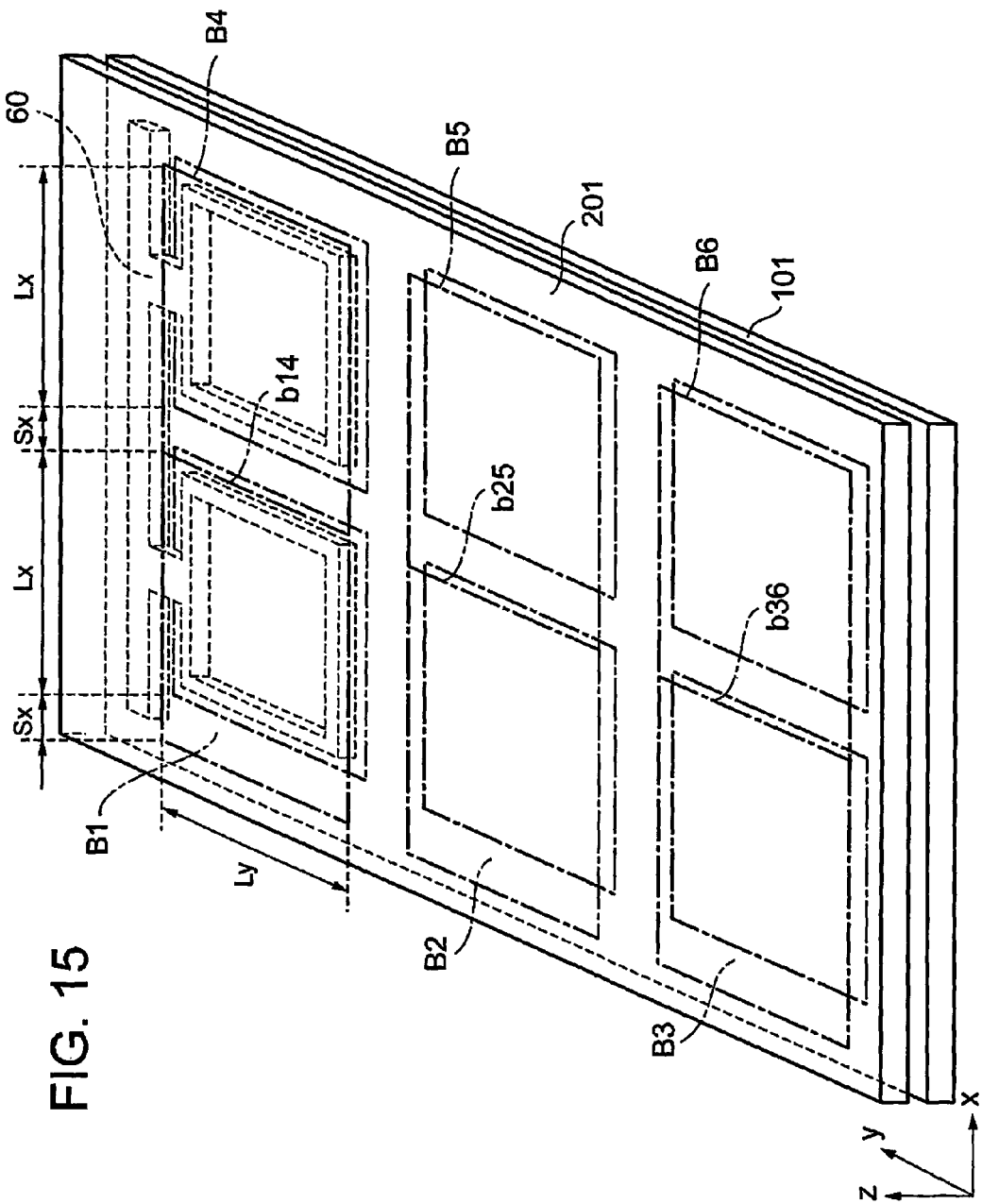
FIG. 15 is a perspective view showing the color filter mother substrate 101 and a TFT mother substrate 201 pasted together.

FIG. 15 is a perspective view showing the color filter mother substrate 101 and TFT mother substrate 201 pasted together. This FIG. 15 shows the sealing body 60 with dotted lines and omits the illustrations of the other two sealing bodies 70 and 80 from the standpoint of viewability.

The TFT mother substrate 201 includes six substantially rectangular TFT substrate portions B1 to B6 in a one-to-one correspondence to the six color filter substrate portions A1 to A6 of the color filter mother substrate 101. Each of these TFT substrate portions B1 to B6 is used as the TFT substrate 20 shown in FIG. 12. The length in the x direction of each of the TFT substrate portions B1 to B6 is longer than the length Lx in the x direction of the color filter substrate portion by Sx and the length in the y direction is the same as the length Ly in the y direction of the color filter substrate portion. The TFT substrate portions B1, B2 and B3 are connected to the TFT substrate portions B4, B5 and B6 through boundaries b14, b25 and b36 respectively.

Figure 16:
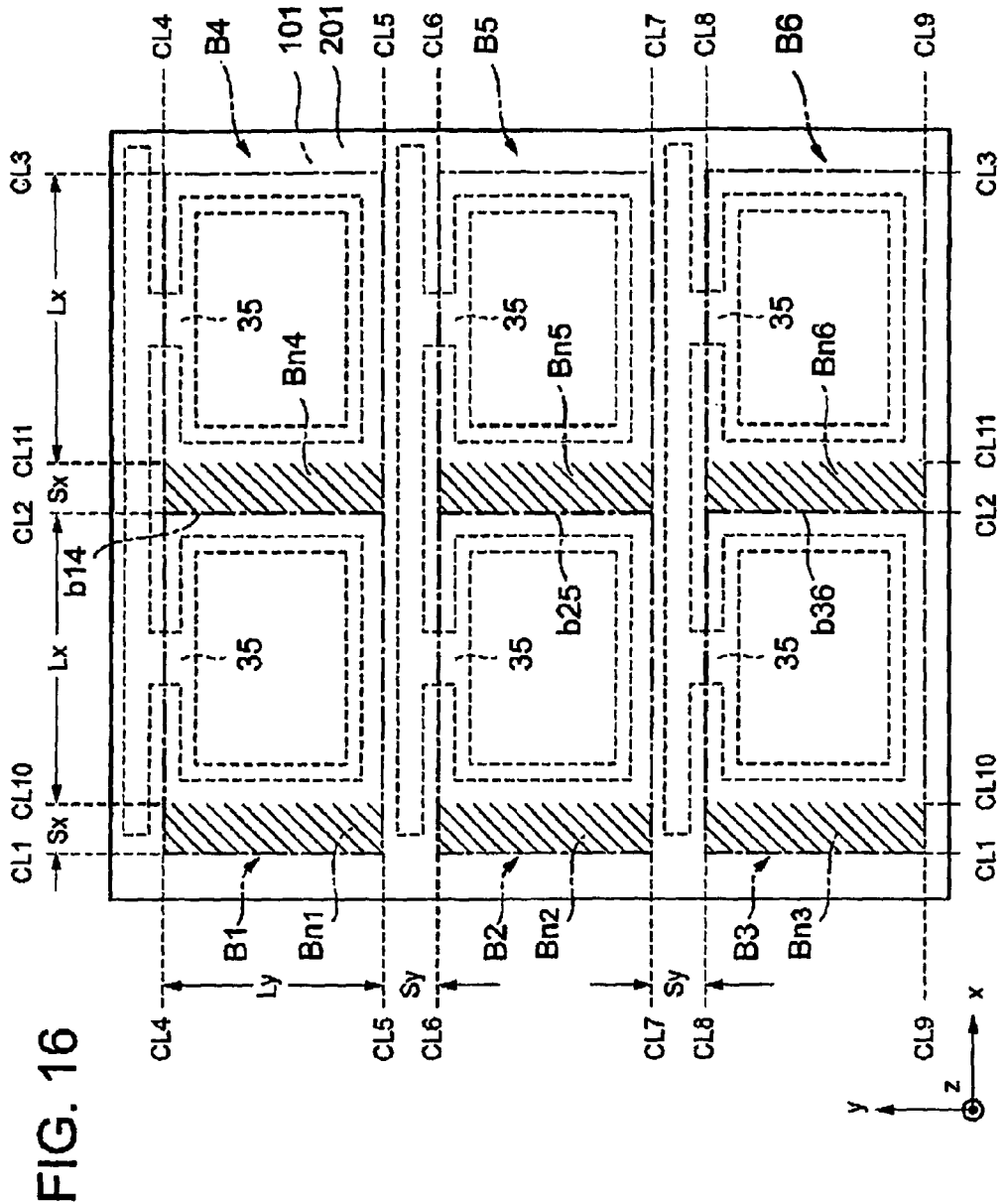
FIG. 16 is a plan view of FIG. 15.

FIG. 16 is a plan view of FIG. 15.

The TFT mother substrate 201 is pasted to the color filter mother substrate 101 in such a way that the TFT substrate portions B1 to B6 face the color filter substrate portions A1 to A6 respectively (see FIG. 14). The TFT substrate portion B1 has the same length in the y direction (Ly) as the length in the y direction (Ly) of the corresponding color filter substrate portion A1, whereas the TFT substrate portion B1 has the length in the x direction (Lx+Sx) longer than the length in the x direction (Lx) of the color filter substrate portion A1 by Sx. Therefore, the TFT substrate portion B1 includes apart (shown with hatching) Bn1 which does not face the color filter substrate portion A1. The other TFT substrate portions B2 to B6 also include parts Bn2 to Bn6 which do not face the corresponding color filter substrates A2 to A6. A terminal group (not shown) for connections with an external circuit is formed in the parts Bn1 to Bn6 which do not face the color filter substrate portion. The color filter mother substrate 101 includes the six color filter substrate portions A1 to A6, while the TFT mother substrate 201 includes the six TFT substrate portions B1 to B6, and therefore six combinations of color filter substrate portions and TFT substrate portions are obtained.

When the TFT mother substrate 201 is pasted to the color filter mother substrate 101, the sealing bodies 60 to 80 are pressed, and therefore the widths of the sealing bodies 60 to 80 increase, and as a result, seal bonded portions 35 are formed.

As shown above, after the color filter mother substrate 101 and TFT mother substrate 201 are pasted together, the sealing bodies 60 to 80 having the seal bonded portions 35 are cured.

Through the curing of the sealing bodies 60 to 80, the TFT mother substrate 201 is strongly bonded to the color filter mother substrate 101 and these substrates 101 and 201 are assembled. After the assembly, the color filter mother substrate 101 and TFT mother substrate 201 are cut along 11 cutting lines CL1 to CL11. Of the 11 cutting lines CL1 to CL11, the nine cutting lines CL1 to CL9 are the lines to cut both the color filter mother substrate 101 and the TFT mother substrate 201, while the remaining two cutting lines CL10 and CL11 are the lines to cut only the color filter mother substrate 101.

As shown above, the substrates 101 and 201 are cut along the eleven cutting lines, and so six liquid crystal cells 2 shown in FIG. 11 are manufactured in this way.

Figure 17:
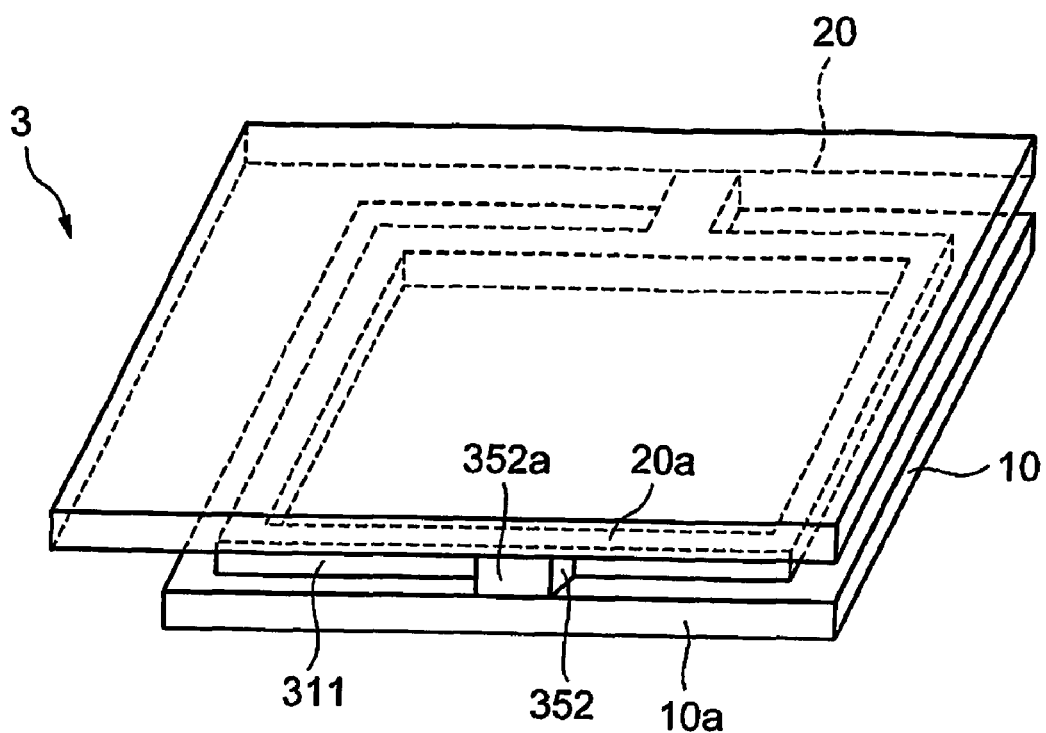
FIG. 17 is a perspective view of a liquid crystal cell 3 according to a third embodiment of the present invention.
Figure 18:
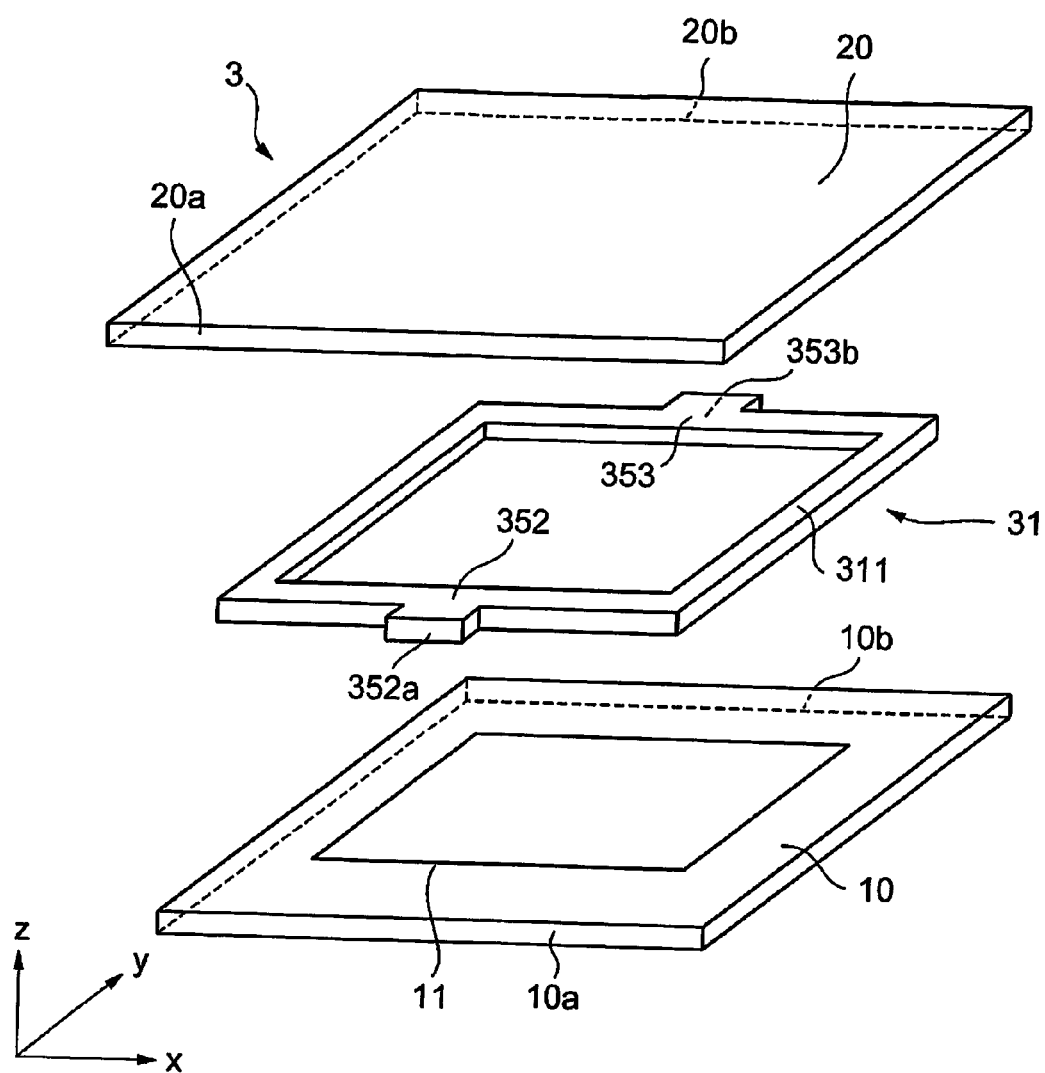
FIG. 18 is an exploded view of the liquid crystal cell 3 shown in FIG. 17.

FIG. 17 is a perspective view of a liquid crystal cell 3 according to a third embodiment of the present invention and FIG. 18 is an exploded view of the liquid crystal cell 3 shown in FIG. 17.

Unlike the liquid crystal cells 1 and 2 shown in FIG. 1 and FIG. 12, the liquid crystal cell 3 shown in FIG. 17 includes two sealing means making portions 352 and 353. Aside end face 352a of the sealing means making portion 352 is substantially flush with a side end face 10a of a color filter substrate 10 and a side end face 20a of a TFT substrate 20 and a side end face 353b of the sealing means making portion 353 is substantially flush with a side end face 10b of the color filter substrate 10 and aside end face 20b of the TFT substrate 20. The method for manufacturing the liquid crystal cell 3 will be explained with reference to FIG. 19 to FIG. 22 as well as FIG. 17 and FIG. 18.

Figure 19:
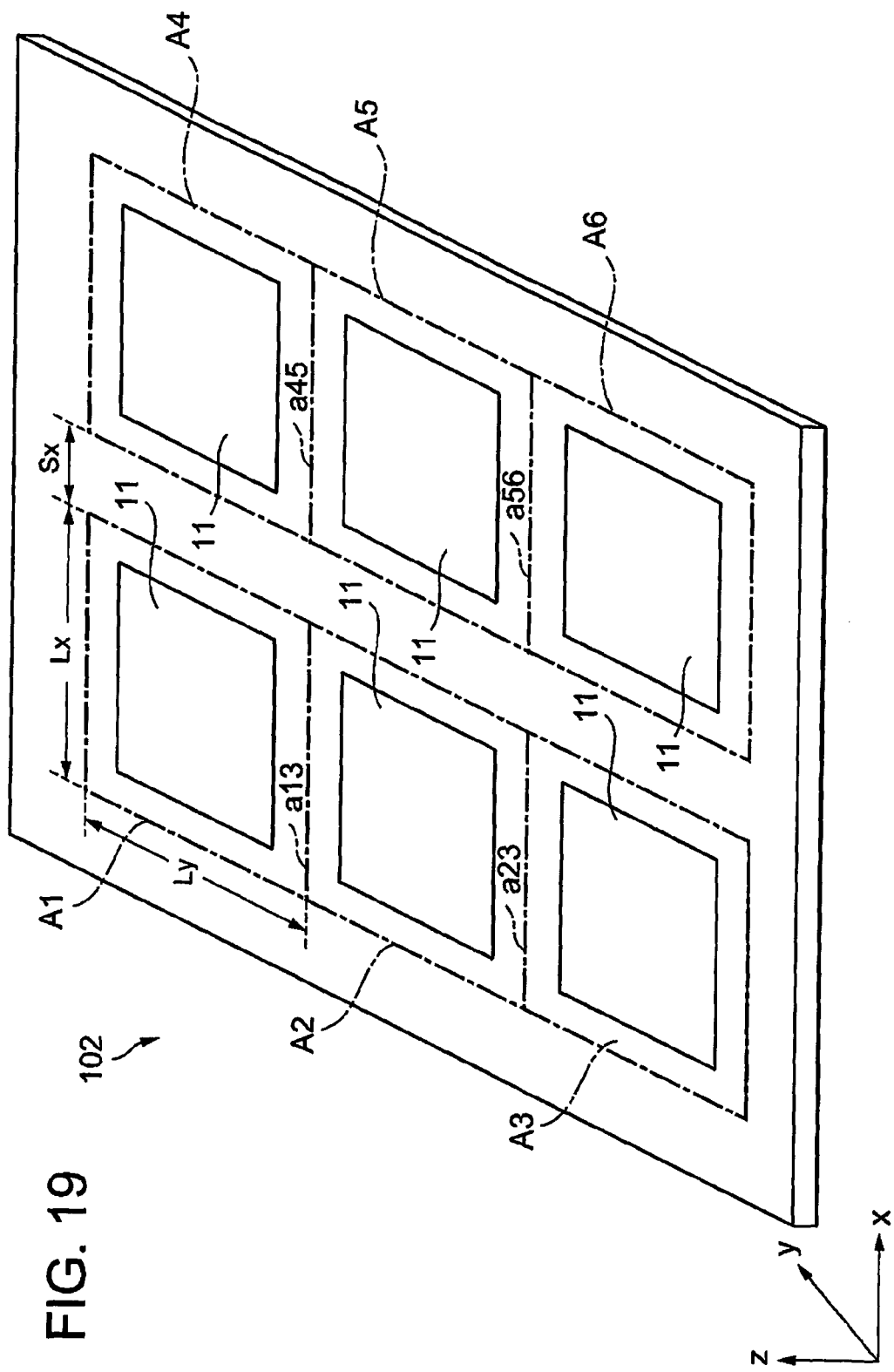
FIG. 19 is a perspective view of a color filter mother substrate 102 having a plurality of color filter substrate portions.

FIG. 19 is a perspective view of a color filter mother substrate 102 having a plurality of color filter substrate portions.

As with the color filter mother substrate 101 shown in FIG. 13, the color filter mother substrate 102 includes six color filter substrate portions A1 to A6. Note that the color filter substrate portions mutually neighboring in the y direction contact each other. The color filter substrate portions A1 and A2 are separated by a boundary a13 and the color filter substrate portions A2 and A3 are separated by a boundary a23. Likewise, the color filter substrate portions A4 and A5 are separated by a boundary a45 and the color filter substrate portions A5 and A6 are separated by a boundary a56. A seal material is applied to the color filter mother substrate 102 having the color filter substrate portions A1 to A6 having contact with each other in the y direction.

Figure 20:
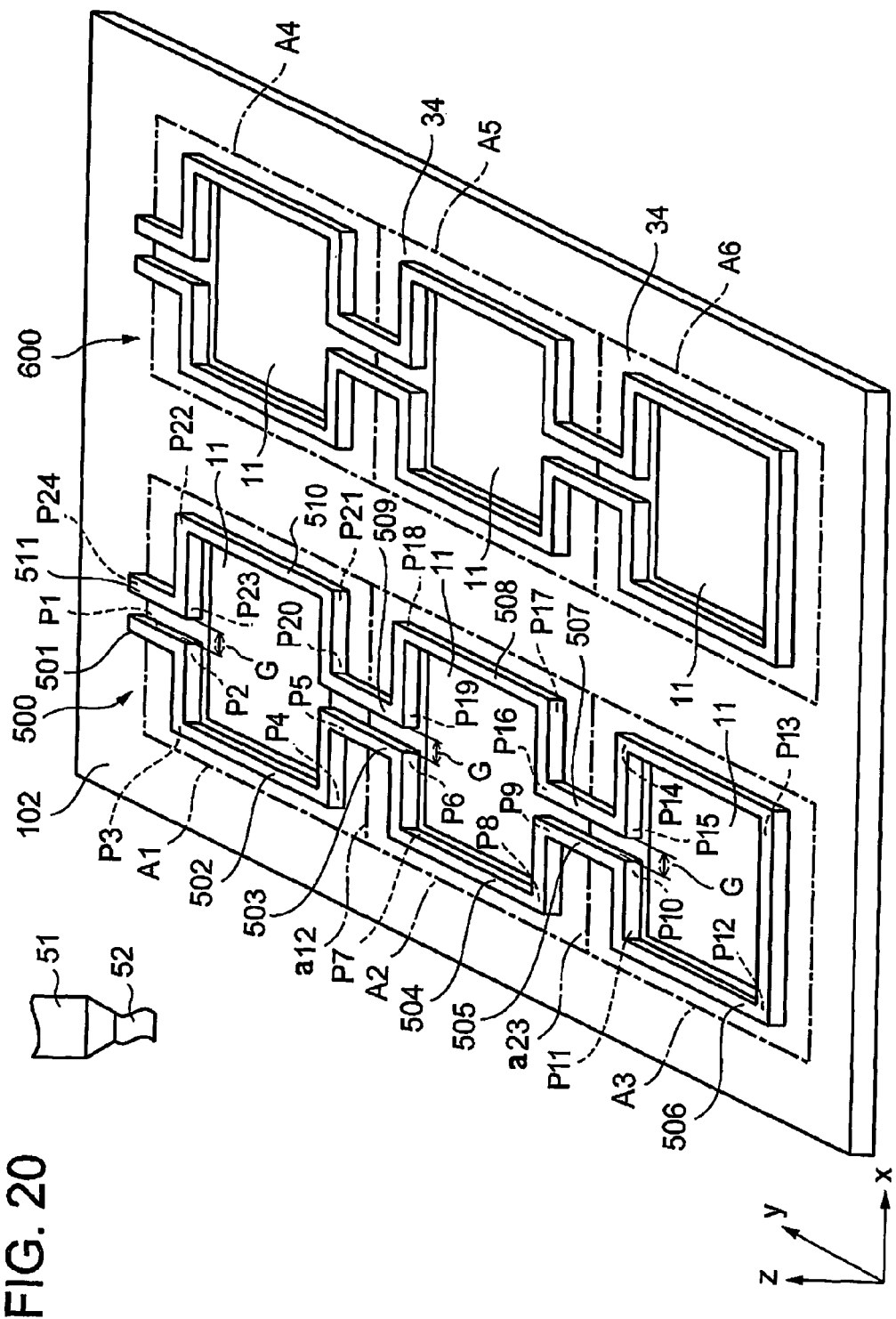
FIG. 20 is a perspective view of the color filter mother substrate 102 with a seal material applied thereto.

FIG. 20 is a perspective view showing the color filter mother substrate 102 with a seal material applied thereto.

As shown in FIG. 20, the seal material is applied to the color filter substrate portions A1 to A3 and A4 to A6 arranged side by side in the y direction, and as a result, two sealing bodies 500 and 600 are formed. The sealing bodies 500 and 600 are formed by continuously discharging a seal material 52 from a nozzle 51 and applying the discharged seal material 52 to the color filter mother substrate 102 according to the patterns of the sealing bodies 500 and 600. The sealing bodies 500 and 600 are formed using the same procedure, and therefore the procedure for forming the sealing body 500 will be explained below as a representative.

A seal making portion 501 is formed by discharging the seal material 52 from the nozzle 51 of a dispenser and applying the seal material 52 from position P1 outside the color filter substrate portion A1 to position P2 inside the color filter substrate portion A1. Next, a seal sub portion 502 which is connected to the seal making portion 501 is formed by applying the seal material 52 which is connected to the seal making portion 501 from position P2 through positions P3 and P4 to position P5. Next, note that in the third embodiment, the seal material 52 which is connected to the seal sub portion 502 is applied from position P5 in the color filter substrate portion A1 to position P6 in the adjacent color filter substrate portion A2. In this way, a seal making portion 503 which is connected to the seal sub portion 502 of the color filter substrate portion A1 and crosses the boundary a12 between the color filter substrate portions A1 and A2 is formed. Next, a seal sub portion 504 which is connected to the seal making portion 503 is formed by applying the seal material 52 which is connected to the seal making portion 503 from position P6 through positions P7 and P8 to position P9. Then, the seal material 52 which is connected to the seal sub portion 504 is applied from position P9 in the color filter substrate portion A2 to position P10 in the adjacent color filter substrate portion A3. In this way, a seal making portion 505 which is connected to the seal sub portion 504 and crosses the boundary a23 between the color filter substrate portions A2 and A3 is formed. Here, note that the color filter substrate portion A3 is positioned in the last stage of the three adjacent color filter substrate portions A1 to A3. Therefore, after the seal making portion 55 is formed, the seal material is applied from position P10 through positions P11, P12, P13 and P14 to position P15, and as a result, a seal main portion 506 which encompasses the display area 11 in the color filter substrate portion A3 is formed. Next, the seal material 52 which is connected to the seal main portion 506 is applied from position P15 in the color filter substrate portion A3 to position P16 in the adjacent color filter substrate portion A2. In this way, a seal making portion 507 which is connected to the seal main portion 506 of the color filter substrate portion A3 and crosses the boundary a23 between the color filter substrate portions A2 and A3 is formed. A gap portion G is provided between the seal making portions 505 and 507. When the seal making portion 507 is formed, the application of the seal material to the color filter substrate portion A3 is completed.

Next, a seal sub portion 508 and a seal making portion 509 are formed by applying the seal material 52 which is connected to the seal making portion 507 from position P16 through positions P17, P18 and P19 to position P20. The seal making portion 509 is formed so as to cross the boundary a12. A gap portion G is provided between the seal making portions 503 and 509. When the seal making portion 509 is formed, the application of the seal material to the color filter substrate portion A2 is completed.

Next, a seal sub portion 510 and a seal making portion 511 are formed by applying the seal material 52 which is connected to the seal making portion 509 from position P20 through positions P21, P22 and P23 to position P24. This seal making portion 511 is formed so as to extend from the inside to the outside of the color filter substrate portion A1. A gap portion G is provided between the seal making portions 501 and 511. When the seal making portion 511 is formed, the application of the seal material to the color filter substrate portions A1 to A3 is completed.

The sealing body 600 is also formed in the same way as for the sealing body 500.

After the sealing bodies 500 and 600 are formed on the color filter mother substrate 102 as shown above, a liquid crystal is dropped into the color filter substrate portions A1 to A6 and a TFT mother substrate is pasted to the color filter mother substrate 102.

Figure 21:
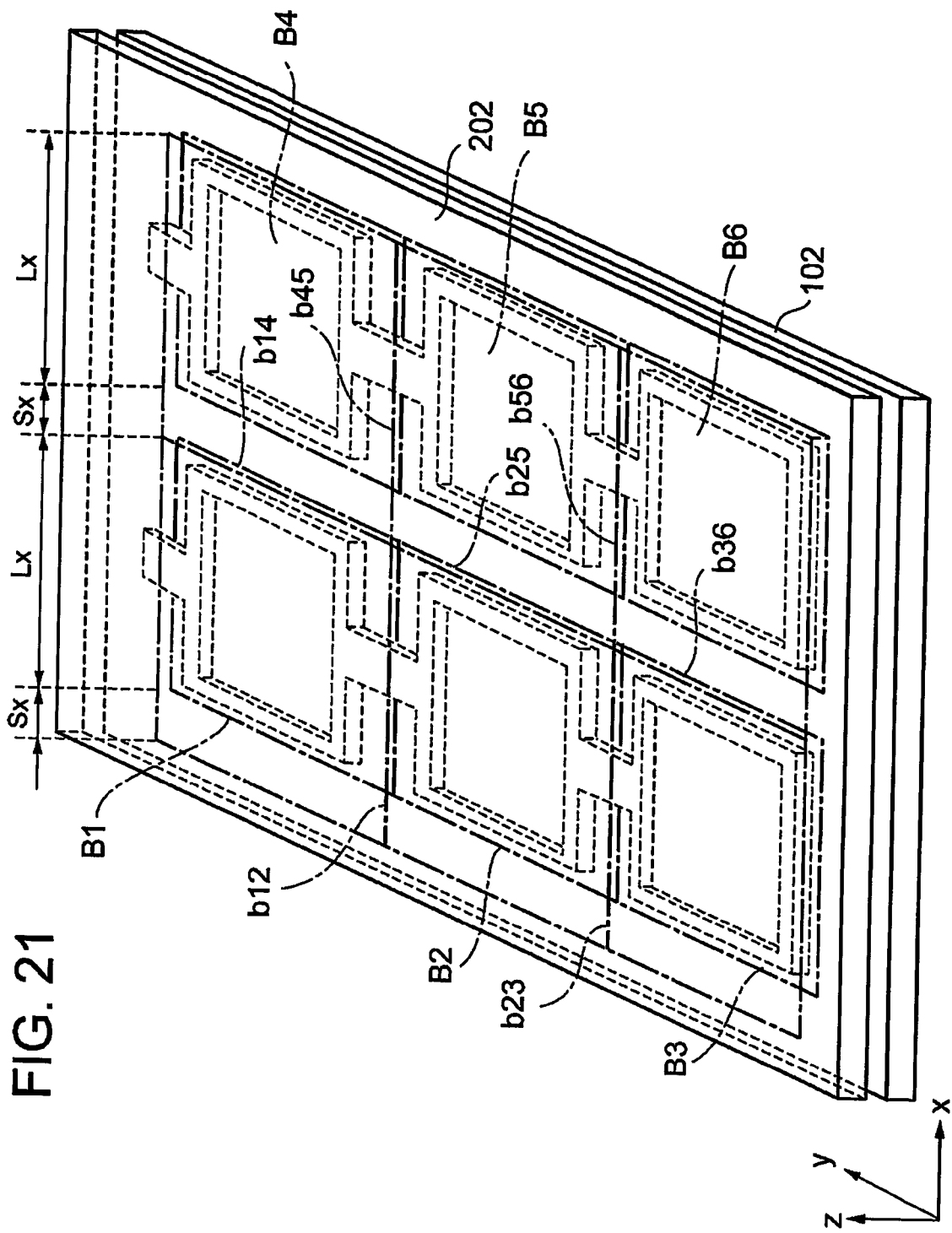
FIG. 21 is a perspective view of the color filter mother substrate 102 and a TFT mother substrate 202 pasted together.

FIG. 21 is a perspective view of the color filter mother substrate 102 and the TFT mother substrate 202 pasted together.

The TFT mother substrate 202 includes six substantially rectangular TFT substrate portions B1 to B6 in a one-to-one correspondence to the six color filter substrate portions A1 to A6 of the color filter mother substrate 102. The TFT substrate portions B1 to B6 are each used as the TFT substrate 20 shown in FIG. 18. The length in the x direction of each of the TFT substrate portions B1 to B6 is longer than the length Lx in the x direction of the color filter substrate portion by Sx and the length in the y direction is the same as the length Ly in the y direction of the color filter substrate portion. In the third embodiment as well as the second embodiment, the TFT substrate portions B1, B2 and B3 are connected to the TFT substrate portions B4, B5 and B6 through the boundaries b14, b25 and b36. However, note that in the third embodiment unlike the second embodiment, TFT substrate portions neighboring in the y direction also contact each other. The TFT substrate portion B2 contacts the TFT substrate portions B1 and B3 through the boundaries b12 and b23 respectively and the TFT substrate portion B5 contacts the TFT substrate portion B4 and B6 through the boundaries b45 and b56 respectively.

Figure 22:
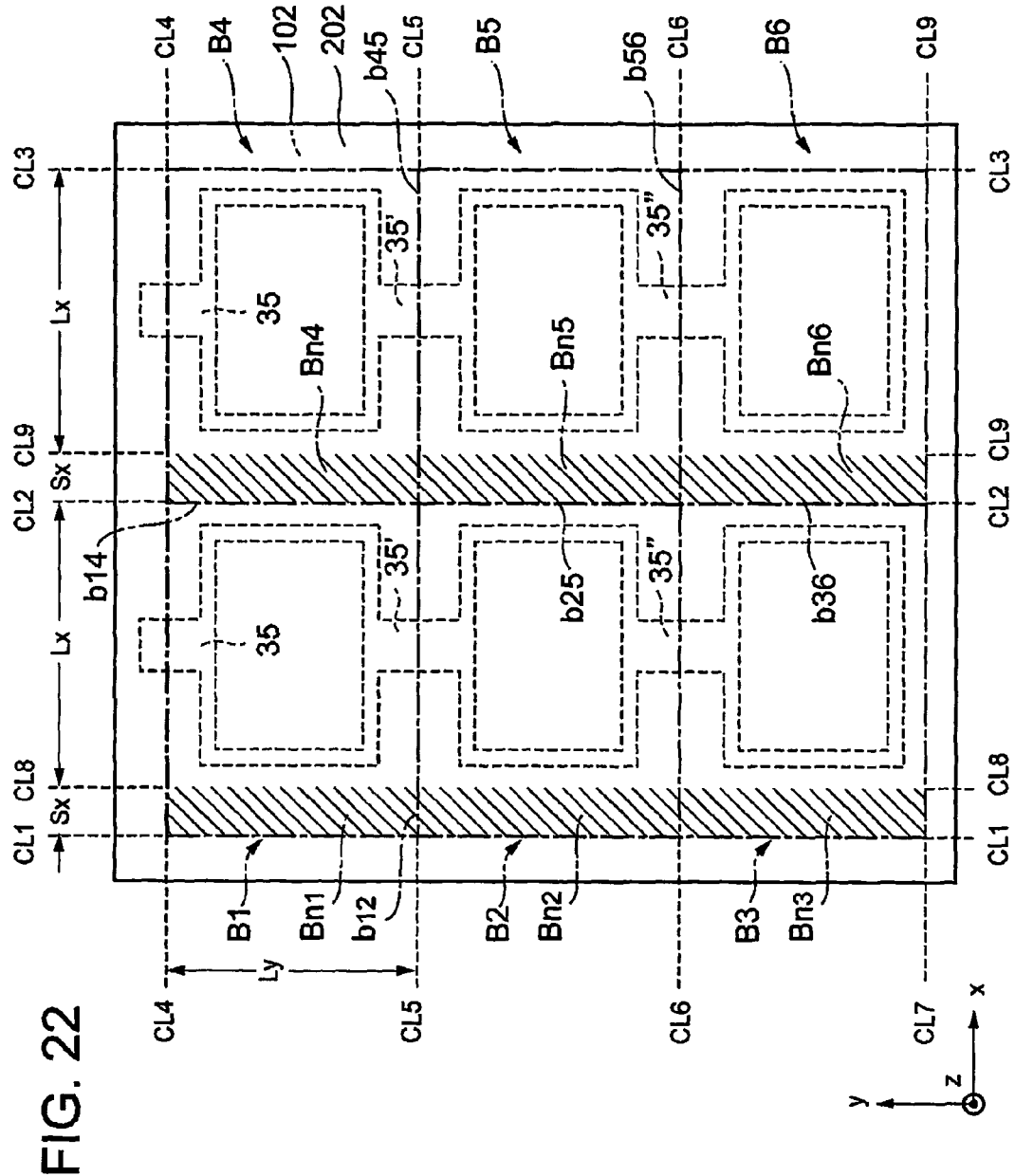
FIG. 22 is a plan view of FIG. 21.

FIG. 22 is a plan view of FIG. 21.

The TFT mother substrate 202 is pasted to the color filter mother substrate 102 in such a way that the TFT substrate portions B1 to B6 face the color filter substrate portions A1 to A6 (see FIG. 20) respectively. The length (Ly) in the y direction of the TFT substrate portion B1 is the same as the length (Ly) in the y direction of the corresponding color filter substrate portion A1 but the length (Lx+Sx) in the x direction is longer than the length (Lx) in the x direction of the corresponding color filter substrate portion A1 by Sx. Therefore, the TFT substrate portion B1 includes a part not facing the color filter substrate portion A1 (shown with hatching) Bn1. The other TFT substrate portions B2 to B6 also include parts Bn2 to Bn6 not facing the corresponding color filter substrate portions A2 to A6. Terminal groups (not shown) for connections with an external circuit are formed in the parts Bn1 to Bn6 not facing the respective color filter substrate portions. The color filter mother substrate 102 has six color filter substrate portions A1 to A6, while the TFT mother substrate 202 includes six TFT substrate portions B1 to B6, and therefore six combinations of the color filter substrate portions and TFT substrate portions are obtained.

When the TFT mother substrate 202 is pasted to the color filter mother substrate 102, the sealing bodies 500 and 600 are pressed and the line widths of the sealing bodies 500 and 600 (see FIG. 20) become thicker, and as a result, seal bonded portions 35, 35' and 35" are formed in the respective sealing bodies 500 and 600. Here, note that the seal bonded portions 35' and 35" extend over the two adjacent TFT substrate portions.

After the color filter mother substrate 102 and TFT mother substrate 202 are pasted together as shown above, the sealing bodies 500 and 600 having the seal bonded portions 35, 35' and 35" are cured. Through the curing of the sealing bodies 500 and 600, the TFT mother substrate 202 is strongly bonded to the color filter mother substrate 102 and these substrates 102 and 202 are assembled. After the assembly, the color filter mother substrate 102 and TFT mother substrate 202 are cut along nine cutting lines CL1 to CL9. Of the nine cutting lines CL1 to CL9, the seven cutting lines CL1 to CL7 are lines to cut both the color filter mother substrate 102 and TFT mother substrate 202, while the remaining two cutting lines CL8 and CL9 are lines to cut only the color filter mother substrate 102.

Through the above described cutting, four liquid crystal cells 3 shown in FIG. 17 are manufactured and two liquid crystal cells 2 shown in FIG. 11 are manufactured from the color filter mother substrate 102 and TFT mother substrate 202 pasted together.

According to the third embodiment, the sealing bodies 500 and 600 (see FIG. 20) extend in the y direction, and therefore it is not necessary to form the seal starting portion 61, seal intermediate portion 65 and seal end portion 69 (see FIG. 14) which are formed in the second embodiment. Therefore, the distance Sy (see FIG. 16) which is necessary in the second embodiment need not be provided in the third embodiment, and as a result, the color filter substrate portions aligned in the y direction (and TFT substrate portions aligned in the y direction) contact each other. Therefore, according to the third embodiment, even if the areas of the color filter mother substrate 102 and TFT mother substrate 202 are smaller than the areas in the second embodiment, the same number (6) of liquid crystal cells 3 as the liquid crystal cells 2 obtained in the second embodiment are obtained. Furthermore, according to the third embodiment, it is possible to arrange the color filter substrate portions (and TFT substrate portions) packed in the y direction, and thereby even use the parts which cannot be used as the color filter substrate portions (and TFT substrate portions) in the second embodiment as parts of the color filter substrate portions (and TFT substrate portions). Therefore, according to the third embodiment, it is possible to manufacture more liquid crystal cells than the second embodiment.

Note that the third embodiment cannot adopt the sealing bodies 60 to 80 which are used in the second embodiment instead of the sealing bodies 500 and 600. The reason for this will be explained below.

In the third embodiment unlike the second embodiment, the TFT substrate portion B2 contacts the TFT substrate portions B1 and B3 through the boundaries b12 and b23 and the TFT substrate portion B5 contacts the TFT substrate portions B3 and B6 through the boundaries b45 and b56 (see FIG. 22). Therefore, in the third embodiment, if the sealing bodies 60 to 80 adopted in the second embodiment are used instead of the sealing bodies 500 and 600, the seal intermediate portions 65 of the sealing bodies 60 to 80 cross the parts Bn4 to Bn6 of the TFT substrate portions B4 to B6. Since terminal groups for connections with an external circuit are provided for these parts Bn4 and Bn6, if the seal intermediate portions 65 cross the terminal groups, these seal intermediate portions 65 interfere with the connections between the terminal groups and external circuit. Therefore, the third embodiment cannot adopt the sealing bodies 60 to 80 adopted in the second embodiment. In order to prevent such interference, the third embodiment adopts the sealing bodies 500 and 600 (see FIG. 20) instead of the sealing bodies 60 to 80 (see FIG. 14) adopted in the second embodiment. Since the sealing bodies 500 and 600 do not cross the parts Bn4 to Bn6, it is possible to eliminate the above described interference.

In the third embodiment, two pairs of the seal making portions having the gap portion G between the respective color filter substrate portions A1, A2, A4 and A5 are formed, but it is also possible to form three or more pairs of seal making portions.

It is possible to construct an image display device using the liquid crystal cells 1, 2 and 3 according to the above described first, second and third embodiments.

In the first, second and third embodiments, the sealing bodies are formed on the color filter mother substrate, but the sealing bodies may also be formed on the TFT mother substrate instead of the color filter mother substrate.

Furthermore, the first, second and third embodiments have explained the liquid crystal cell as the cell according to the present invention, but note that the present invention is also applicable to the manufacturing of a cell for supporting a material other than the liquid crystal (e.g., organic EL) if it is a cell that supports the material through the two supporting plates and sealing means in cooperation.

Furthermore, only part of the gap portion G may be closed if it can at least reliably hold the liquid crystal in the liquid crystal cell, but it is preferable to close the entire gap portion G.

INDUSTRIAL APPLICABILITY

The present invention is applicable to the field of a cell which holds a material inside and a method for manufacturing such a cell.

The invention claimed is:

1. A method for manufacturing a cell in a drop-filling process, comprising:
    a first step of forming a first sealing body having first and second seal making portions with a first gap portion provided in between around a first area of a first supporting member; and
    a second step of assembling said first supporting member and a second supporting member in such a way that said first sealing body is interposed between said first supporting member and second supporting member,
    wherein in said second step, said first and second seal making portions are deformed in such a way that at least part of said first gap portion is closed,
    wherein in said first step, a second sealing body including third and fourth seal making portions with a second gap provided in between is also formed around a second area of said first supporting member, and said first and second seal making portions are continuously connected to said third and fourth seal making portions respectively, and
    wherein a liquid crystal material is directly dropped into the first and second areas before the first and second supporting members are assembled; and
    wherein when the first and second supporting members are being assembled, the sealing body is pressed between the first and second supporting members, so as to deform the first, second, third and fourth seal making portions to an extent closing said at least a part of said first gap and second gap.

2. A method for manufacturing a cell in a drop-filling process as claimed in claim 1, wherein said first sealing body comprises said first and second seal making portions and a seal main portion along the perimeter of said first area.

3. A method for manufacturing a cell in a drop-filling process as claimed in claim 1, wherein said method for manufacturing a cell further comprises a third step of cutting said first supporting member of said first and second supporting members assembled along a cutting line between said first area and said second area, and in said first step, said first and third seal making portions which are connected continuously and said second and fourth seal making portions which are connected continuously are formed in such a way as to cross said cutting line.

4. A method for manufacturing a cell in a drop-filling process as claimed in claim 3, wherein said first supporting member contacts a first supporting portion including said first area and a second supporting portion which contacts said first supporting portion through a boundary and includes said second area, and said boundary is positioned on said cutting line.

5. The method for manufacturing a cell in a drop-filling process as claimed in claim 1, wherein said first sealing body includes a plurality of pairs of said first and second seal making portions.

6. A method for manufacturing a cell in a drop-filling process as claimed in claim 5, wherein said first sealing body comprises said plurality of pairs and a plurality of seal sub portions along the perimeter of said first area.

7. A cell manufactured using the method for manufacturing a cell as claimed in claim 1.

8. A cell as claimed in claim 7, wherein said cell comprises: a first supporting plate; a second supporting plate; and sealing means interposed between said first supporting plate and said second supporting plate, wherein said sealing means has a surface substantially flush with a side end face of said first or second supporting plate.

9. An image display device comprising the cell as claimed in claim 8.

10. A method for manufacturing a cell in a drop-filling process as claimed in claim 1, wherein said first supporting member is placed over said second supporting member to assemble said first supporting member and said second supporting member after depositing dropping the liquid crystal material.

11. A method for manufacturing a cell comprising:
    a first step of forming a first sealing body having first and second seal making portions with a first gap portion provided in between around a first area of a first supporting member; and
    a second step of assembling said first supporting member and said second supporting member in such a way that said first sealing body is interposed between said first supporting member and second supporting member,
    wherein in said second step, said first and second seal making portions are deformed in such a way that at least part of said first gap portion is closed,
    wherein in said first step, a second sealing body including third and fourth seal making portions with a second gap provided in between is also formed around a second area of said first supporting member,
    wherein said second seal making portion of said first sealing body is continuously connected to said third seal making portion of said second sealing body by a seal intermediate portion.

12. A method for manufacturing a cell as claimed in claim 11, wherein said first sealing body comprises said first and second seal making portions and a seal main portion along the perimeter of said first area.

13. A method for manufacturing a cell as claimed in claim 11, further comprising cutting said first and second supporting members to separate said first sealing body from said second sealing body after sealing said first and second gap potions.

14. A method for manufacturing a cell as claimed in claim 11, wherein said second seal making portion of said first sealing body and said third seal making portion of said second sealing body are cut along a cutting line between said first area and said second area.

15. A method for manufacturing a cell as claimed in claim 11, further comprising depositing a liquid crystal material in said first area after forming said sealing body, wherein said first supporting member is placed over said second supporting member to assemble said first supporting member and said second supporting member after depositing said liquid crystal material within said first area defined by the first sealing body.

16. A cell manufactured using the method for manufacturing a cell as claimed in claim 11.

17. A method for manufacturing a cell, comprising:
    providing first and second supporting substrates;
    forming at least a first sealing body on the first supporting substrates, defining a first area surrounded by the first sealing body on the first support substrate, wherein the first sealing body comprises first and second seal making portions defining a first gap therebetween;

depositing a liquid crystal material within the first area defined by the first sealing body;

placing the second supporting substrate over the first supporting substrate after depositing the liquid crystal material, with the first supporting substrate opposing the second supporting substrate and the first sealing body therebetween; and pressing the first sealing body between the first and second supporting substrates, so as to deform the first and second seal making portions to an extent sealing at least a part of the first gap.

18. The method of claim 17, further comprising forming at least a second sealing body on the first supporting substrates, defining a second area surrounded by the second sealing body on the first support substrate, wherein the second sealing body comprises third and fourth seal making portions defining a second gap therebetween, and wherein the liquid crystal material is also deposited within the second area defined by the second sealing body before placing the second supporting substrate over the first supporting substrate, and the second sealing body is also pressed between the first and second supporting substrates along with the first sealing body, so as to deform the third and fourth seal making portions to an extent sealing at least a part of the second gap.

19. The method of claim 18, wherein the second seal making portion of the first sealing body is continuously connected to the third seal making portion of the second sealing body by an intermediate portion.

* * * * *